US012406675B2

(12) United States Patent
Sharifi et al.

(10) Patent No.: US 12,406,675 B2
(45) Date of Patent: Sep. 2, 2025

(54) MULTI-USER WARM WORDS

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 313 days.

(21) Appl. No.: 18/056,697

(22) Filed: Nov. 17, 2022

(65) Prior Publication Data

US 2024/0169995 A1 May 23, 2024

(51) Int. Cl.
| | |
|---|---|
| G10L 17/00 | (2013.01) |
| G06F 3/16 | (2006.01) |
| G10L 15/00 | (2013.01) |
| G10L 15/08 | (2006.01) |
| G10L 15/16 | (2006.01) |
| G10L 15/22 | (2006.01) |
| G10L 17/22 | (2013.01) |

(52) U.S. Cl.
CPC .............. *G10L 17/22* (2013.01); *G06F 3/167* (2013.01); *G10L 15/22* (2013.01); *G10L 15/00* (2013.01); *G10L 2015/088* (2013.01); *G10L 15/16* (2013.01); *G10L 2015/223* (2013.01); *G10L 17/00* (2013.01)

(58) Field of Classification Search
None
See application file for complete search history.

(56) References Cited

U.S. PATENT DOCUMENTS

| | | | |
|---|---|---|---|
| 9,691,384 B1* | 6/2017 | Wang | G10L 15/18 |
| 10,931,999 B1 | 2/2021 | Jobanputra et al. | |
| 11,132,989 B2* | 9/2021 | Tolomei | H04R 3/005 |
| 11,468,381 B1* | 10/2022 | Harris | G06F 16/9035 |
| 11,676,595 B2* | 6/2023 | Igarashi | H04N 21/4722 |
| | | | 704/251 |

(Continued)

FOREIGN PATENT DOCUMENTS

EP 3674882 A1 7/2020

OTHER PUBLICATIONS

International Search Report and Written Opinion issued in related PCT Application No. PCT/US2023/036905, dated Feb. 2, 2024.

*Primary Examiner* — Richa Sonifrank
(74) *Attorney, Agent, or Firm* — Honigman LLP; Brett A. Krueger; Grant Griffith

(57) ABSTRACT

A method includes detecting a presence of multiple users within an environment of an assistant-enabled device (AED) and obtaining, for each user, a respective active set of warm words that each specify a respective action for a digital assistant to perform. Based on each respective active set of warm words, the method also includes executing a warm word arbitration routine to enable a final set of warm words for detection by the AED. Here, the final set of warm words includes warm words selected from the respective active set of warm words. While the final set of warm words are enabled, the method also includes receiving audio data corresponding to an utterance captured by the AED, detecting a warm word from the final set of warm words in the audio data, and instructing the digital assistant to perform the respective action specified by the detected warm word.

32 Claims, 9 Drawing Sheets

(56) References Cited

U.S. PATENT DOCUMENTS

| | | | | |
|---|---|---|---|---|
| 11,741,969 B1* | 8/2023 | Rao | | H04L 12/2829 |
| | | | | 726/28 |
| 11,948,563 B1* | 4/2024 | Liu | | G06Q 10/1095 |
| 12,218,950 B1* | 2/2025 | Wang | | H04L 63/20 |
| 2015/0007046 A1* | 1/2015 | Branson | | H04L 67/1025 |
| | | | | 709/217 |
| 2016/0085565 A1* | 3/2016 | Arcese | | H04L 63/0861 |
| | | | | 726/7 |
| 2016/0299661 A1* | 10/2016 | Alpert | | G06T 17/05 |
| 2018/0130469 A1* | 5/2018 | Gruenstein | | G10L 15/30 |
| 2018/0182390 A1* | 6/2018 | Hughes | | G10L 15/22 |
| 2018/0323991 A1* | 11/2018 | Segal | | G10L 15/26 |
| 2019/0012139 A1* | 1/2019 | Han | | G10L 15/05 |
| 2019/0189019 A1* | 6/2019 | Hammersley | | G06N 20/00 |
| 2020/0012906 A1* | 1/2020 | Albadawi | | G06V 40/173 |
| 2020/0134211 A1* | 4/2020 | Miller | | H04L 9/088 |
| 2020/0211563 A1* | 7/2020 | Arunachalam | | G10L 15/30 |
| 2020/0342855 A1* | 10/2020 | Casado | | G10L 15/00 |
| 2021/0134280 A1* | 5/2021 | Kurtz | | G10L 15/30 |
| 2021/0201916 A1* | 7/2021 | Touret | | H04M 3/42102 |
| 2021/0337307 A1* | 10/2021 | Wexler | | G06V 40/161 |
| 2021/0366466 A1* | 11/2021 | de La Jonquière | | G06N 3/08 |
| 2021/0375267 A1* | 12/2021 | Patil | | G10L 15/07 |
| 2022/0139388 A1* | 5/2022 | Sharifi | | H04M 3/40 |
| | | | | 704/231 |
| 2022/0157305 A1* | 5/2022 | Sakurai | | G05D 1/223 |
| 2022/0171800 A1* | 6/2022 | Kumaresan | | G06F 11/321 |
| 2022/0180862 A1* | 6/2022 | Sharifi | | G10L 15/04 |
| 2022/0189465 A1* | 6/2022 | Sharifi | | G10L 15/22 |
| 2022/0189471 A1* | 6/2022 | Sharifi | | G10L 15/22 |
| 2023/0061929 A1* | 3/2023 | Carbune | | H04L 63/0861 |
| 2023/0088513 A1* | 3/2023 | Karri | | G06N 20/00 |
| | | | | 704/251 |
| 2023/0113883 A1* | 4/2023 | Carbune | | G10L 15/28 |
| | | | | 704/235 |
| 2024/0013782 A1* | 1/2024 | Siegler | | G10L 15/22 |
| 2024/0119088 A1* | 4/2024 | Sharifi | | G06F 3/167 |
| 2024/0161741 A1* | 5/2024 | Sharifi | | G06F 3/165 |
| 2024/0169995 A1* | 5/2024 | Sharifi | | G10L 17/22 |
| 2024/0184989 A1* | 6/2024 | Mann | | G06F 40/166 |
| 2024/0304990 A1* | 9/2024 | Tran | | H01Q 3/46 |
| 2024/0371372 A1* | 11/2024 | Tasaki | | B60R 16/0373 |

\* cited by examiner

MULTI-USER WARM WORDS

TECHNICAL FIELD

This disclosure relates to multi-user warm words.

BACKGROUND

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. In instances where a device (e.g., a smart speaker) is commonly shared by multiple users in an environment, the device may need to field multiple actions requested by the users that may compete with one another.

SUMMARY

One aspect of the disclosure provides a computer-implemented method that when executed on data processing hardware causes the data processing hardware to perform operations that include detecting a presence of multiple users within an environment of an assistant-enabled device (AED) executing a digital assistant, and for each user of the multiple users, obtaining a respective active set of warm words that each specify a respective action for the digital assistant to perform. Based on the respective active set of warm words for each user of the multiple users, the operations also include executing a warm word arbitration routine to enable a final set of warm words for detection by the AED. The final set of warm words enabled for detection by the AED include warm words selected from the respective active set of warm words for at least one user of the multiple users detected within the environment of the AED. While the final set of warm words are enabled for detection by the AED, the operations also include receiving audio data corresponding to an utterance captured by the AED, detecting, in the audio data, a warm word from the final set of warm words, and instructing the digital assistant to perform the respective action specified by the detected warm word.

Implementations of the disclosure may include one or more of the following optional features. In some implementations, detecting the presence of the multiple users within the environment of the AED includes detecting at least one of the multiple users is present within the environment based on proximity information of the AED relative to a user device associated with the at least one of the multiple users. In additional implementations, detecting the presence of the multiple users within the environment of the AED includes receiving image data corresponding to a scene of the environment and detecting the presence of at least one of the multiple users within the environment based on the image data. In some examples, detecting the presence of the multiple users within the environment of the AED includes detecting the presence of a corresponding user within the environment of the AED based on receiving voice data characterizing a voice query issued by the corresponding user and directed toward the digital assistant, performing speaker identification on the voice data to identify the corresponding user that issued the voice query, and determining that the identified corresponding user that issued the voice query is present within the environment of the AED. In these examples, the voice query issued by the corresponding user comprises a command that causes the digital assistant to perform a long-standing operation specified by the command and obtaining the respective active set of warm words includes adding, in response to the digital assistant performing the long-standing operation specified by the command, to the respective active set of warm words for the corresponding user that issued the voice query, one or more warm words specifying respective actions for controlling the long-standing operation.

In some implementations, the operations also include detecting the presence of a new user within the environment of the AED, wherein the warm word arbitration routine executes in response to detecting the presence of the new user within the environment. The operations may optionally include determining that one of the multiple users is no longer present within the environment of the AED, wherein the warm word arbitration routine executes in response to determining that the one of the multiple users is no longer present within the environment. In some examples, the operations also include determining addition of a new warm word to, or removal of one of the warm words from, the respective active set of warm words for one of the multiple users present in the environment of the AED, wherein the warm word arbitration routine executes in response to determining the addition of the new warm word to, or the removal of the one of the warm words from, the respective active set of warm words for the one of the multiple users present in the environment of the AED. In some implementations, the operations also include determining a change in ambient context of the AED, wherein the warm word arbitration routine executes in response to determining the change in ambient context.

In some examples, executing the warm word arbitration routine includes obtaining enabled warm word constraints and determining a number of warm words to enable in the final set of warm words for detection by the AED based on the enabled warm word constraints. Here, the enabled warm word constraints include at least one of memory and computing resource availability on the AED for detection of warm words, computational requirements for enabling each warm word in the respective active set of warm words for each user of the multiple users present in the environment of the AED, an acceptable false accept rate tolerance, or an acceptable false reject rate tolerance. In some implementations, executing the warm word arbitration routine includes ranking the warm words in the respective active set of warm words from highest priority to lowest priority based on warm word prioritization signals for each corresponding user of the multiple users, and enabling the final set of warm words for detection by the AED based on the rankings of the warm words in the respective active set of warm words for each corresponding user of the multiple users. In some examples, executing the warm word arbitration routine includes identifying any shared warm words corresponding to warm words present in the respective active set of warm words for each of at least two of the multiple users and determining the final set of warm words is based on assigning, for inclusion in the final set of warm words, a higher priority to warm words identified as shared warm words.

In some implementations, executing the warm word arbitration routine includes determining a warm word affinity score for each user and enabling the final set of warm words for detection by the AED based on the warm word affinity score determined for each corresponding user. Here, the warm word affinity score determined for each corresponding user may be based on at least one of: frequency of warm word usage by the corresponding user; frequency of interactions between the corresponding user and the digital assistant; duration of presence of the corresponding user in the environment of the AED; a proximity of the user relative to the AED; or a current user context.

In some examples, the operations further include determining that the warm word detected in the audio data corresponding to the utterance captured by the user device comprises a speaker-specific warm word selected from the respective active set of warm words for each of one or more users among the multiple users such that the digital assistant only performs the respective action specified by the speaker-specific warm word when the speaker-specific warm word is spoken by any of the one or more users corresponding to the respective active set of warm words, and based on determining that the warm word detected in the audio data corresponding to the utterance captured by the user device includes a speaker-specific warm word, performing speaker verification on the audio data to determine that the utterance was spoken by one of the one or more users corresponding to the respective active set of warm words that the detected warm word was selected. Here, instructing the digital assistant to perform the respective action specified by the detected warm word is based on the speaker verification performed on the audio data.

In some implementations, final set of warm words are enabled for detection by activating, for each warm word in the final set of warm words, a respective warm word model to run on the assistant-enabled device, and detecting, in the audio data, the warm word from the final set of warm words includes detecting, using the activated respective warm word model, the warm word in the audio data without performing speech recognition on the audio data. In these implementations, detecting the warm word in the audio data may include extracting audio features of the audio data, generating, using the activated respective warm word model, a warm word confidence score by processing the extracted audio features, and determining that the audio data corresponding to the utterance includes the warm word when the warm word confidence score satisfies a warm word confidence threshold. The final set of warm words may be enabled for detection by executing a speech recognizer on the AED, the speech recognizer biased to recognize the warm words in the final set of warm words, and detecting, in the audio data, the warm word from the final set of warm words may include recognizing, using the speech recognizer executing on the AED, the repeat warm word in the audio data.

Another aspect of the disclosure provides a system including data processing hardware and memory hardware in communication with the data processing hardware. The memory hardware stores instructions that when executed by the data processing hardware cause the data processing hardware to perform operations that include detecting a presence of multiple users within an environment of an assistant-enabled device (AED) executing a digital assistant, and for each user of the multiple users, obtaining a respective active set of warm words that each specify a respective action for the digital assistant to perform. Based on the respective active set of warm words for each user of the multiple users, the operations also include executing a warm word arbitration routine to enable a final set of warm words for detection by the AED. The final set of warm words enabled for detection by the AED include warm words selected from the respective active set of warm words for at least one user of the multiple users detected within the environment of the AED. While the final set of warm words are enabled for detection by the AED, the operations also include receiving audio data corresponding to an utterance captured by the AED, detecting, in the audio data, a warm word from the final set of warm words, and instructing the digital assistant to perform the respective action specified by the detected warm word.

This aspect may include one or more of the following optional features. In some implementations, detecting the presence of the multiple users within the environment of the AED includes detecting at least one of the multiple users is present within the environment based on proximity information of the AED relative to a user device associated with the at least one of the multiple users. In additional implementations, detecting the presence of the multiple users within the environment of the AED includes receiving image data corresponding to a scene of the environment and detecting the presence of at least one of the multiple users within the environment based on the image data. In some examples, detecting the presence of the multiple users within the environment of the AED includes detecting the presence of a corresponding user within the environment of the AED based on receiving voice data characterizing a voice query issued by the corresponding user and directed toward the digital assistant, performing speaker identification on the voice data to identify the corresponding user that issued the voice query, and determining that the identified corresponding user that issued the voice query is present within the environment of the AED. In these examples, the voice query issued by the corresponding user comprises a command that causes the digital assistant to perform a long-standing operation specified by the command and obtaining the respective active set of warm words includes adding, in response to the digital assistant performing the long-standing operation specified by the command, to the respective active set of warm words for the corresponding user that issued the voice query, one or more warm words specifying respective actions for controlling the long-standing operation.

In some implementations, the operations also include detecting the presence of a new user within the environment of the AED, wherein the warm word arbitration routine executes in response to detecting the presence of the new user within the environment. The operations may optionally include determining that one of the multiple users is no longer present within the environment of the AED, wherein the warm word arbitration routine executes in response to determining that the one of the multiple users is no longer present within the environment. In some examples, the operations also include determining addition of a new warm word to, or removal of one of the warm words from, the respective active set of warm words for one of the multiple users present in the environment of the AED, wherein the warm word arbitration routine executes in response to determining the addition of the new warm word to, or the removal of the one of the warm words from, the respective active set of warm words for the one of the multiple users present in the environment of the AED. In some implementations, the operations also include determining a change in ambient context of the AED, wherein the warm word arbitration routine executes in response to determining the change in ambient context.

In some examples, executing the warm word arbitration routine includes obtaining enabled warm word constraints and determining a number of warm words to enable in the final set of warm words for detection by the AED based on the enabled warm word constraints. Here, the enabled warm word constraints include at least one of memory and computing resource availability on the AED for detection of warm words, computational requirements for enabling each warm word in the respective active set of warm words for each user of the multiple users present in the environment of the AED, an acceptable false accept rate tolerance, or an acceptable false reject rate tolerance. In some implementations, executing the warm word arbitration routine includes ranking the warm words in the respective active set of warm words from highest priority to lowest priority based on warm word prioritization signals for each corresponding user of the multiple users, and enabling the final set of warm words for detection by the AED based on the rankings of the warm words in the respective active set of warm words for each corresponding user of the multiple users. In some examples, executing the warm word arbitration routine includes identifying any shared warm words corresponding to warm words present in the respective active set of warm words for each of at least two of the multiple users and determining the final set of warm words is based on assigning, for inclusion in the final set of warm words, a higher priority to warm words identified as shared warm words.

In some implementations, executing the warm word arbitration routine includes determining a warm word affinity score for each user and enabling the final set of warm words for detection by the AED based on the warm word affinity score determined for each corresponding user. Here, the warm word affinity score determined for each corresponding user may be based on at least one of: frequency of warm word usage by the corresponding user; frequency of interactions between the corresponding user and the digital assistant; duration of presence of the corresponding user in the environment of the AED; a proximity of the user relative to the AED; or a current user context.

In some examples, the operations further include determining that the warm word detected in the audio data corresponding to the utterance captured by the user device comprises a speaker-specific warm word selected from the respective active set of warm words for each of one or more users among the multiple users such that the digital assistant only performs the respective action specified by the speaker-specific warm word when the speaker-specific warm word is spoken by any of the one or more users corresponding to the respective active set of warm words, and based on determining that the warm word detected in the audio data corresponding to the utterance captured by the user device includes a speaker-specific warm word, performing speaker verification on the audio data to determine that the utterance was spoken by one of the one or more users corresponding to the respective active set of warm words that the detected warm word was selected. Here, instructing the digital assistant to perform the respective action specified by the detected warm word is based on the speaker verification performed on the audio data.

In some implementations, final set of warm words are enabled for detection by activating, for each warm word in the final set of warm words, a respective warm word model to run on the assistant-enabled device, and detecting, in the audio data, the warm word from the final set of warm words includes detecting, using the activated respective warm word model, the warm word in the audio data without performing speech recognition on the audio data. In these implementations, detecting the warm word in the audio data may include extracting audio features of the audio data, generating, using the activated respective warm word model, a warm word confidence score by processing the extracted audio features, and determining that the audio data corresponding to the utterance includes the warm word when the warm word confidence score satisfies a warm word confidence threshold. The final set of warm words may be enabled for detection by executing a speech recognizer on the AED, the speech recognizer biased to recognize the warm words in the final set of warm words, and detecting, in the audio data, the warm word from the final set of warm words may include recognizing, using the speech recognizer executing on the AED, the repeat warm word in the audio data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
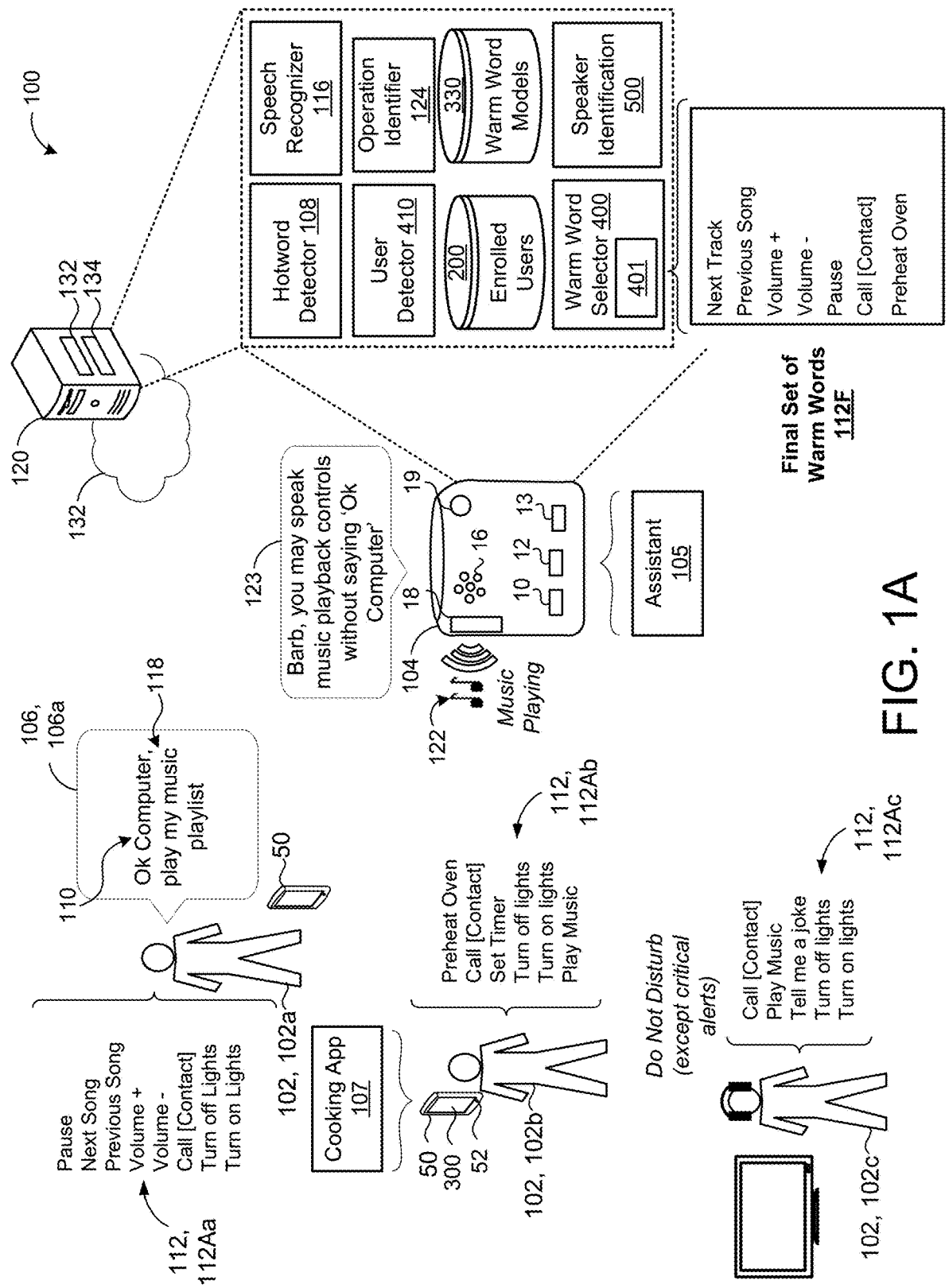
FIGS. 1A-1C are schematic views of an example system including multiple users having respective active sets of warm words that each specify a respective action for a digital assistant to perform.

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. Consequently, the assistant-enabled device must have some way of discerning when any given utterance in a surrounding environment is directed toward the device as opposed to being directed to an individual in the environment or originating from a non-human source (e.g., a television or music player). One way to accomplish this is to use a hotword, which by agreement among the users in the environment, is reserved as a predetermined word(s) that is spoken to invoke the attention of the device. In an example environment, the hotword used to invoke the assistant's attention are the words "OK computer." Consequently, each time the words "OK computer" are spoken, it is picked up by a microphone, conveyed to a hotword detector, which performs speech modeling techniques to determine whether the hotword was spoken and, if so, awaits an ensuing command or query. Accordingly, utterances directed at an assistant-enabled device take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

In cases where the user provides a sequence of several hotword based commands to an assistant-enabled device, such as a mobile phone or smart speaker, the user's interaction with the phone or speaker may become awkward. The user may speak, "Ok computer, play my homework playlist." The phone or speaker may begin to play the first song on the playlist. The user may wish to advance to the next song and speak, "Ok computer, next." To advance to yet another song, the user may speak, "Ok computer, next," again. To alleviate the need to keep repeating the hotword before speaking a command, the assistant-enabled device may be configured to recognize/detect a narrow set of hotphrases or warm words to directly trigger respective actions. In the example, the warm word "next" serves the dual purpose of a hotword and a command so that the user can simply utter "next" to invoke the assistant-enabled device to trigger performance of the respective action instead of uttering "Ok computer, next." Other non-limiting warm words and hotphrases may include "what's the weather?", "set a timer", "volume up", and "volume down".

A set of warm words can be active for controlling a long-standing operation. As used herein, a long-standing operation refers to an application or event that a digital assistant performs for an extended duration and one that can be controlled by the user while the application or event is in progress. For instance, when a digital assistant sets a timer for 30-minutes, the timer is a long-standing operation from the time of setting the timer until the timer ends or a resulting alert is acknowledged after the timer ends. In this instance, a warm word such as "stop timer" could be active to allow the user to stop the timer by simply speaking "stop timer" without first speaking the hotword. Likewise, a command instructing the digital assistant to play music from a streaming music service is a long-standing operation while the digital assistant is streaming music from the streaming music service through a playback device. In this instance, an active set of warm words can be "pause", "pause music", "volume up", "volume down", "next", "previous", etc., for controlling playback of the music the digital assistant is streaming through the playback device. The long-standing operation may include multi-step dialogue queries such as "book a restaurant" in which different sets of warm words will be active depending on a given stage of the multi-step dialogue. For instance, the digital assistant may prompt a user to select from a list of restaurants, whereby a set of warm words may become active that each include a respective identifier (e.g., restaurant name or number in list) for selecting a restaurant from the list and complete the action of booking a reservation for that restaurant.

One challenge with warm words is limiting the number of words/phrases that are simultaneously active so that quality and efficiency is not degraded. For instance, a number of false positives indicating when the assistant-enabled device incorrectly detected/recognized one of the active words greatly increases the larger the number of warm words that are simultaneously active. Moreover a user that seeds a command to initiate a long-running operation cannot prevent others from speaking active warm words for controlling the long-running operation.

Since warm words and/or hotphrases may be active for extended periods of time (e.g., always-on), there may often be a limit in terms of how many different words/phrases may be enabled for detection by an assistant-enabled device (AED) at any given time. For instance, a computational budget based on computing resource constraints due to processing capabilities and memory availability on the AED may impact how many different warm words can be enabled at any given time. Considerations of computational budget is especially important for battery-powered devices since the models for recognizing/detecting warm words and/or hotphrases typically run on digital signal processors (DSPs). Another challenge with warm words is limiting the number of words/phrases that are simultaneously enabled so that quality and efficiency is not degraded. For instance, a number of false positives (i.e., also referred to as 'false alarm rate') indicating when the AED incorrectly detected/recognized one of the warm words greatly increases the larger the number of warm words that are simultaneously enabled for detection by the AED.

As the total number of different warm words that can be enabled for detection is typically limited due to the one or more of the factors mentioned above, difficulties on shared AEDs that aim to serve multiple users (e.g., household family members sharing an assistant-enabled device) arise since different users may have divergent preferences that each may depend on different sets of warm words being active. For instance, one user may wish to issue commands for controlling music playback on the AED, while another user sharing the same AED may wish to issue messaging commands for facilitating communication of messages between that user and some remote recipient. Moreover, some of the users may have different tolerance preferences with respect to consequences of false-accepting (and/or false-rejecting) detection of warm words. For instance, some users may tolerate an over-trigger of "stop" while other users may not. Ideally, the AED aims to enable as many of the warm words in each active set of warm words based on the computational budget of the AED at any given time.

Implementations herein are directed toward detecting a presence of multiple users within an environment of the AED and obtaining the respective active set of warm words that each specify a respective action for the digital assistant to perform. Based on the respective active set of warm words obtained for each user, implementations are further directed toward executing a warm word arbitration routine to enable a final set of warm words for detection by the AED whereby the final set of warm words include warm words selected from the respective active set of warm words for at least one of user among the multiple users detected within the environment of the AED As used herein, an "active" warm word includes a warm word that a user prefers to have the AED enable for detection/recognition without requiring the user to speak a predefined hotword to "wake-up" the AED, whereas a warm word in the final set of warm words enabled for detection is affirmatively enabled for the AED to detect/recognize. Thus, as long as the computational budget of the AED permits, the warm word arbitration routine will aim to include all of the active warm words in the final set of warm words enabled for detection by the AED. Otherwise, when a total number of warm words permissible in the final set of warm words is less than a total number of active warm words from the respective active sets of warm words, the warm word arbitration routine is tasked with selecting those active warm words for inclusion in the final set of warm words that are ranked with higher priorities than those not selected for inclusion in the final set of warm words. As a result, there may be conditions and scenarios where a warm word found in an active set of warm words for a given user may ultimately not be included in the final set of warm words, and thus, not enabled for detection by the AED such that unselected warm word would not be recognized/detected when spoken in an utterance unless the utterance also included a predefined hotword (e.g., "Hey Computer). Accordingly, the warm word arbitration routine aims to dynamically select warm words for inclusion in the final set of warm words on an ongoing basis in order to maximize the total number of warm words permissible in the final set of warm words enabled for detection by the AED.

Figure 1B:
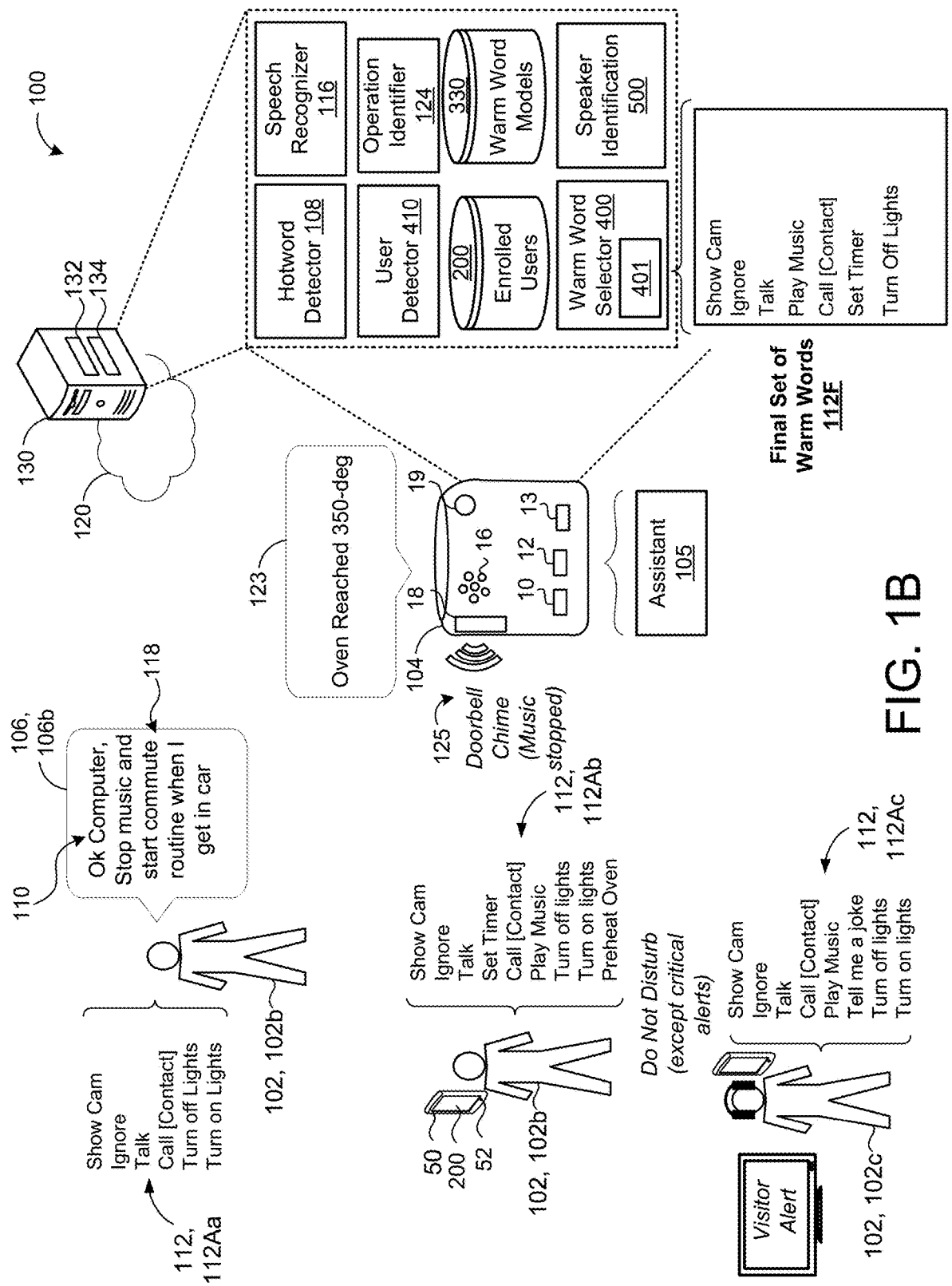
Figure 1C:
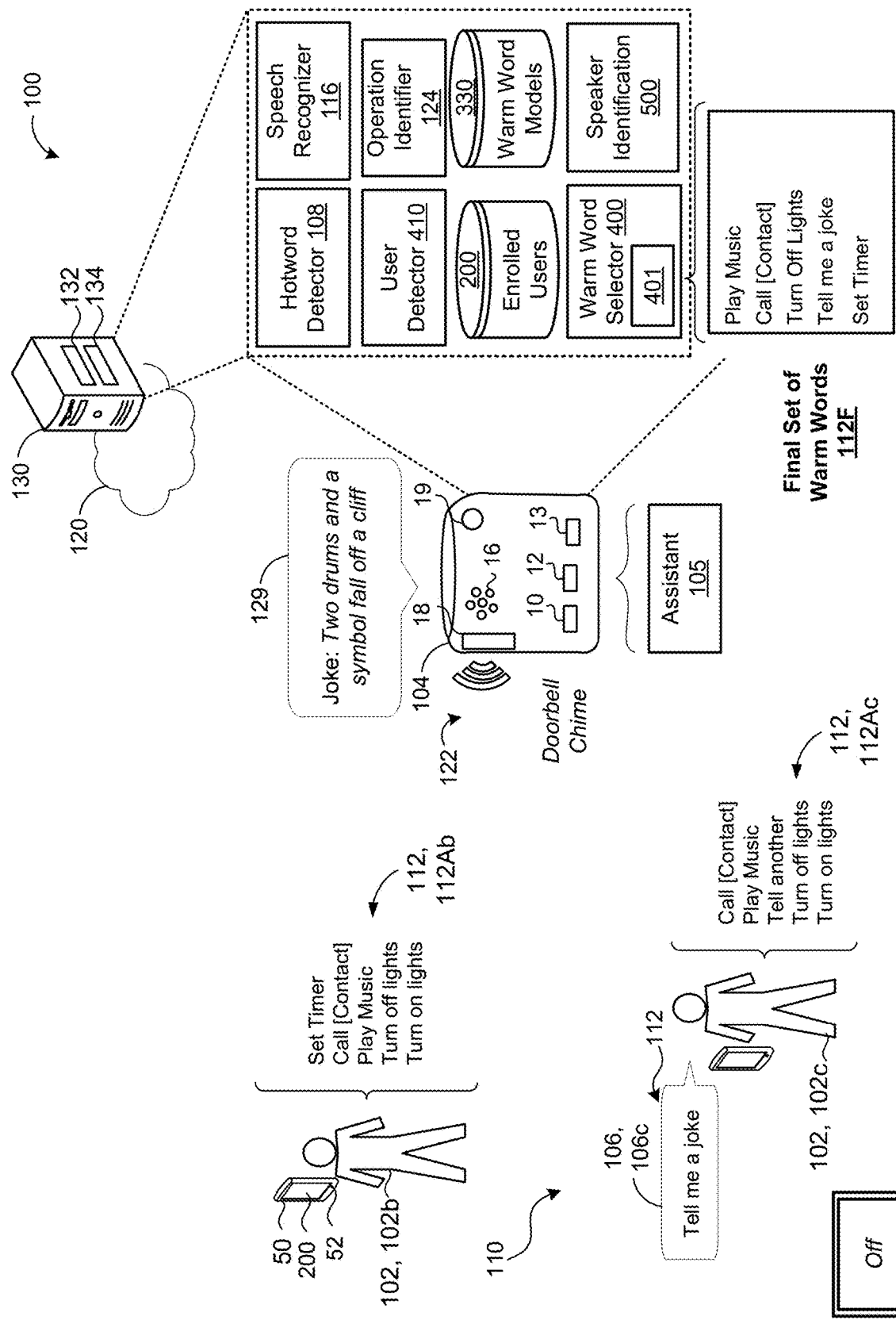

FIGS. 1A-1C illustrate an example system 100 for enabling a final set of warm words 112F for detection by an assistant-enabled device (AED) 104, wherein the final set of warm words 112F include warm words 112 selected from a respective active set of warm words 112A for at least one user among multiple users detected within an environment of the AED 104. The AED 104 may execute one or more digital assistants 105 and each warm word 112 (whether present in one of the active sets and/or the final set of warm words 112A, 112F) specifies a respective action for at least one of the one or more digital assistants 105 to perform. The users 102 may interact with a digital assistant 105 through speech. For simplicity, examples herein depict the AED 104 executing a single digital assistant 105. However, the present disclosure is not limited to the number of digital assistants 105 the AED 104 is capable of executing at any given time such that the AED 104 can execute any combination of digital assistants concurrently or individually at any given time.

In some implementations, for each warm word 112 in the final set of warm words 112F, the AED 104 additionally receives a respective warm word model 330 configured to detect the corresponding warm word 112 in streaming audio without performing speech recognition. For example, the AED 104 (and/or the server 130) additionally includes one or more warm word models 330. Here, the warm word models 330 may be stored on the memory hardware 12 of the AED 104 or the remote memory hardware 134 on the server 130. If stored on the server 130, the AED 104 may request the server 130 to retrieve a warm word model 330 for a corresponding warm word 112 and provide the retrieved warm word model 330 so that the AED 104 (via the warm word arbitration routine 401) can enable the warm word model 330. An enabled warm word model 330 running on the AED 104 may detect an utterance of the corresponding warm word 112 in streaming audio captured by the AED 104 without performing speech recognition on the captured audio. Further, a single warm word model 330 may be capable of detecting all of the warm words 112 from the final set of warm words 112F in streaming audio.

In some configurations, the AED 104 receives code associated with an application loaded on the AED 104 (e.g., a music application running in the foreground or background of the AED 104) to identify any warm words 112 and associated warm word models 330 that developers of the application want users 102 to be able to speak to interact with the application and the respective actions for each warm word 112. In other examples, the AED 104 receives, for at least one warm word 112 in the respective active set of warm words 112A for at least one user 102, via a warm word application programming interface (API) executing on the AED 104, a respective warm word model 330 configured to detect the corresponding warm word 112 in streaming audio without performing speech recognition. The warm words 112 in the registry may also relate to follow-up queries that the user 102 (or typical users) tend to issue following the given query, e.g., "Ok computer, play my music playlist".

In additional implementations, enabling the final set of warm words 112F causes the AED 104 to execute the speech recognizer 116 in a low-power and low-fidelity state. Here, the speech recognizer 116 is constrained or biased to only recognize the warm words in the final set of warm words 112F when spoken in utterances captured by the AED 104. Since the speech recognizer 116 is only recognizing a limited number of terms/phrases, the number of parameters of the speech recognizer 116 may be drastically reduced, thereby reducing the memory requirements and number of computations needed for recognizing the active warm words in speech. Accordingly, the low-power and low-fidelity characteristics of the speech recognizer 116 may be suitable for execution on a digital signal processor (DSP). In these implementations, the speech recognizer 116 executing on the AED 104 may recognize an utterance 106 of a warm word 112 in streaming audio captured by the AED 104 in lieu of using a warm word model 330. In some examples, detection of a warm word 112 by a corresponding warm word model 330 is confirmed by the speech recognizer 116 performing speech recognition on the audio data.

Figure 4:
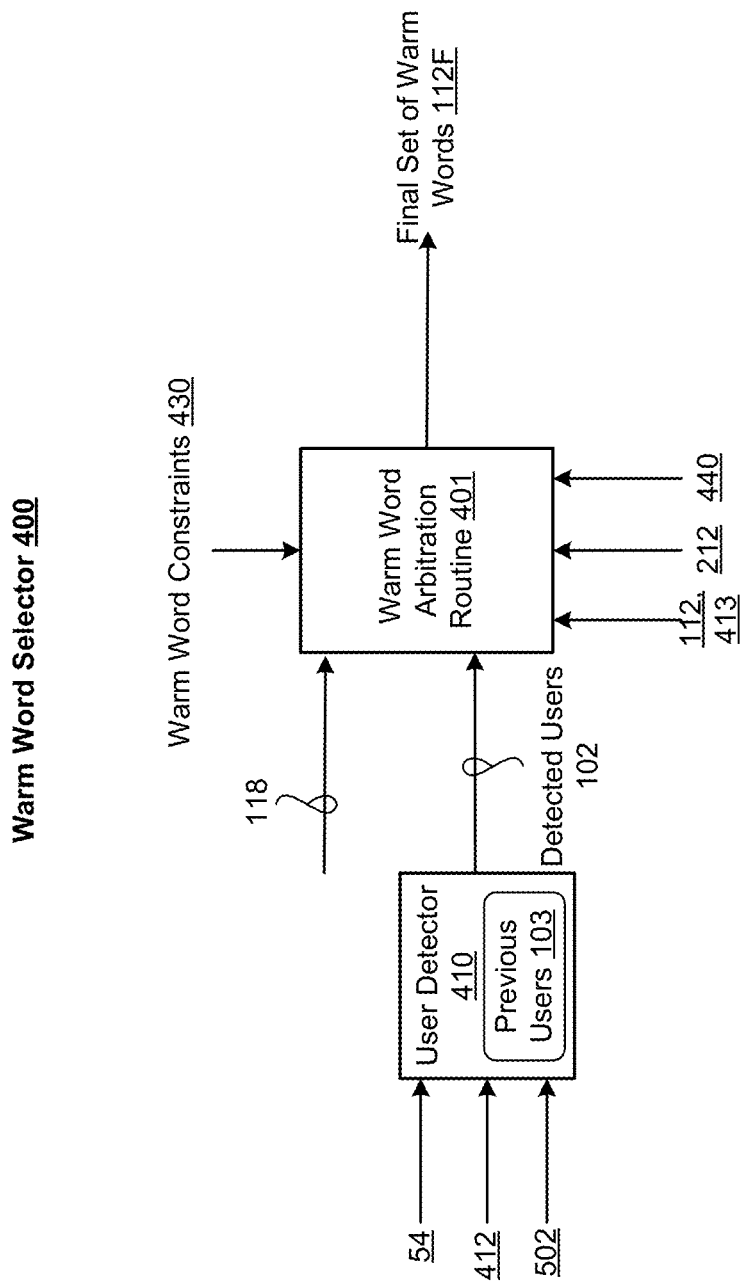
FIG. 4 is a schematic view of an example warm word arbitration process for enabling a final set of warm words for detection on an assistant-enabled device.

In the example shown, the AED 104 includes a smart speaker. However, the AED 104 can include other computing devices, such as, without limitation, a smart phone, tablet, smart display, headset, desktop/laptop, smart watch, smart appliance, headphones, other wearables, or vehicle infotainment device. The AED 104 includes data processing hardware 10 and memory hardware 12 storing instructions that when executed on the data processing hardware 10 cause the data processing hardware 10 to perform operations. The AED 104 includes an array of one or more microphones 16 configured to capture acoustic sounds such as speech directed toward the AED 104. The AED 104 may also include, or be in communication with, an audio output device (e.g., speaker) 18 that may output audio such as music 122 and/or synthesized speech from the digital assistant 105. In some configurations, the AED 104 also includes, or is in communication with, a display 13 configured to display content from various sources. Moreover, the AED 104 may include, or be in communication with, one or more cameras 19 configured to capture images within the environment and output image data 412 (FIG. 4).

In some configurations, the AED 104 is in communication with multiple user devices 50 associated with the multiple users 102. In the examples shown, the second and third users 102b, 102c each include a respective user device 50 that includes a smart phone that the respective user 102 may interact with. However, the user device 50 can include other computing devices, such as, without limitation, a smart watch, smart display, smart glasses, a smart phone, smart glasses/headset, tablet, smart appliance, headphones, a computing device, a smart speaker, or another assistant-enabled device. Each user device 50 may include at least one microphone 52 residing on the user device 50 and in communication with the AED 104. In these configurations, the user device 50 may also be in communication with the one or more microphones 16 residing on the AED 104. Additionally, the multiple users 102 may control and/or configure the AED 104, as well as interact with the digital assistant 105, using an interface 200, such as a graphical user interface (GUI) 200 rendered for display on a respective screen of each user device 50.

With continued reference to FIGS. 1A-1C and 4, during execution of the digital assistant 105, the AED 104 detects the multiple users 102a-c in the environment using a user detector 410 and obtains a respective active set of warm words 112A for each user 102 detected in the environment.

Based on the respective active set of warm words 112A for each of the multiple users 102 detected in the environment of the AED 104, a warm word selector 400 running on the AED 104 selects a final set of warm words 112F to enable for simultaneous detection on the AED 104. For example, the warm word selector 400 receives proximity information 54 (FIG. 4) for the location of each of the multiple users 102a-c relative to the AED 104 via the user detector 410. In some implementations, for one or more of the users 102 having a respective user device 50, the respective user device 50 is capable of broadcasting proximity information 54 receivable by the user detector 410 that the AED 104 uses to determine the proximity of each user device 50 relative to the AED 104. The proximity information 54 from each user device 50 may include wireless communication signals, such as WiFi, Bluetooth, or Ultrasonic, in which the signal strength of the wireless communication signals received by the user detector 410 may correlate proximities (e.g. distances) of the user device 50 relative to the AED 104. The proximity information 54 received from each user device 50 may include a device identifier 50 that uniquely identifies the device 50 and that may be used by the user detector 410 to resolve an identity of the user 102 using conventional techniques.

In additional implementations, the user detector 410 automatically detects one or more of the multiple users 102 in the environment by receiving image data 412 corresponding to a scene of the environment and obtained by the camera 19. Here, the user detector 410 detects the multiple users 102 based on the received image data 312. The user detector 410 may detect the users 102 based on the image data 412 anonymously without uniquely identifying the users 102. In some implementations, the user detector 410 performs facial recognition on the received image data 312 and attempts to uniquely identify each user 102 based on the facial recognition performed. In these implementations, each user 102 expressly grants privileges to the digital assistant 105 to perform facial recognition and each user 102 has the option to revoke the granted privilege at any time.

Similarly, the user detector 410 may detect the multiple users 102 in the environment by performing speaker identification (FIG. 5) to resolve the identity of a user 102 within the environment. Here, the user detector 410 may detect one or more of the multiple users 102 based on received audio data 502 associated with the issued queries, and the user detector 410 may continue to detect a user 102 that issued a query (and associated audio data 502) for a threshold amount of time after the user 102 spoke. Notably, the user detector 510 may use any combination of techniques to obtain results that may be correlated to detect the number of different users 102 within the environment of the AED 102. Each user device 50 may broadcast a current active set of warm words 112A for the associated user 102 that the warm word selector (and warm word arbitration routine 401) receives. Similarly, the active set of warm words 112A for one or more of the detected users 102 may be retrieved from profile information associated with a detected user once an identity of the user 102 is resolved.

In some implementations, the user detector 410 resolves an identity of each of the multiple users. In some scenarios, a user 102 is identified as an enrolled user 200 of the AED 104 that is authorized to access or control various functions of the AED 104 and digital assistant 105. The AED 104 may have multiple different enrolled users 200 each having registered user accounts indicating particular permissions or rights regarding functionality of the AED 104. For instance, the AED 104 may operate in a multi-user environment such as a household with multiple family members, whereby each family member corresponds to an enrolled user 200 having permissions for accessing a different respective set of resources. To illustrate, a mother named Barb speaking the command "play my music playlist" would result in the digital assistant 105 streaming music from a rock music playlist associated with the mother, as opposed to a different music playlists created by, and associated with, another enrolled user 200 of the household such as a teenage daughter whose playlist includes pop music.

Figure 2:
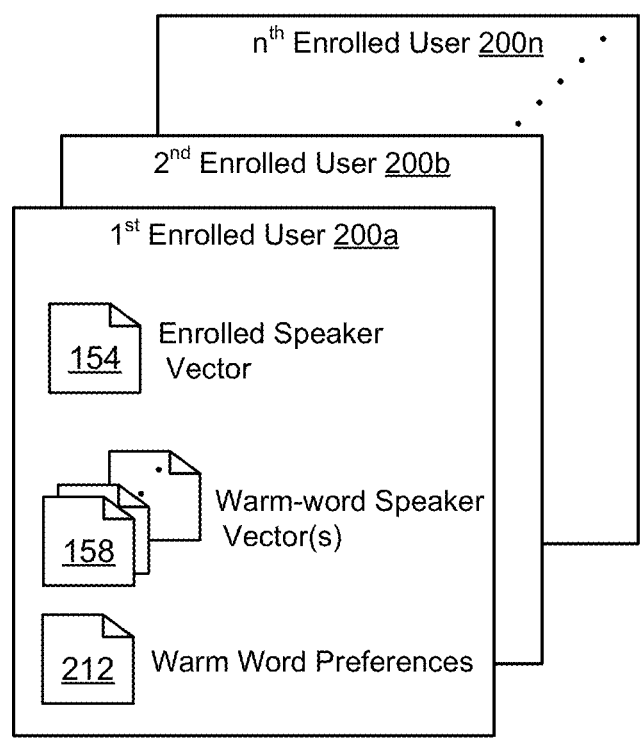
FIG. 2 is an example data store storing enrolled user data.

FIG. 2 shows an example data store storing enrolled user data/information for each of multiple enrolled users 200a-n of the AED 104. Here, each enrolled user 200 of the AED 104 may undertake a voice enrollment process to obtain a respective enrolled speaker vector 154 from audio samples of multiple enrollment phrases spoken by the enrolled user 200. For example, a speaker-discriminative model 510 (FIG. 5) may generate one or more enrolled speaker vectors 154 from the audio samples of enrollment phrases spoken by each enrolled user 200 that may be combined, e.g., averaged or otherwise accumulated, to form the respective enrolled speaker vector 154. One or more of the enrolled users 200 may use the AED 104 to conduct the voice enrollment process, where the microphone 16 captures the audio samples of these users speaking the enrollment utterances and the speaker-discriminative model 510 generates the respective enrolled speaker vectors 154 therefrom. The model 510 may execute on the AED 104, the server 120, or a combination thereof. Additionally, one or more of the enrolled users 200 may enroll with the AED 104 by providing authorization and authentication credentials to an existing user account with the AED 104. Here, the existing user account may store enrolled speaker vectors 154 obtained from a previous voice enrollment process with another device also linked to the user account.

In some examples, the enrolled speaker vector 154 for an enrolled user 200 includes a text-dependent enrolled speaker vector. For instance, the text-dependent enrolled speaker vector may be extracted from one or more audio samples of the respective enrolled user 200 speaking a predetermined term such as the hotword 110 (e.g., "Ok computer") used for invoking the AED 104 to wake-up from a sleep state. In other examples, the enrolled speaker vector 154 for an enrolled user 200 is text-independent obtained from one or more audio samples of the respective enrolled user 200 speaking phrases with different terms/words and of different lengths. In these examples, the text-independent enrolled speaker vector may be obtained over time from audio samples obtained from speech interactions the user 102 has with the AED 104 or other device linked to the same account.

Additionally, the AED 104 (and/or server 120) may optionally store one or more other text-dependent speaker vectors 158 each extracted from one or more audio samples of the respective enrolled user 200 speaking a specific term or phrase. For example, the enrolled user 200a may include a respective text-dependent speaker vector 158 for each of one or more warm words 112 that, when enabled for detection by the AED 104, may be spoken to cause the AED 104 to perform a respective action for controlling a long-standing operation or perform some other command. Accordingly, a text-dependent speaker vector 158 for a respective enrolled user 200 represents speech characteristics of the respective enrolled user 200 speaking the specific warm word 112. A text-dependent speaker vector 154 stored for a respective enrolled user 200 that is associated with a specific warm word 112 may be used to verify the respective enrolled user 200 speaking the specific warm word 112 to command the AED 104 to perform an action for controlling a long-standing operation.

FIG. 2 also shows the AED 104 (and/or server 120) storing warm word preferences 212 for the respective enrolled user 200. The warm word preferences 212 may include a list of warm words the user 102 selects for inclusion in a respective active set of warm words 112A. Some of the warm words in the respective active set of warm words 112A may be activity-based such that the warm words are only "active" depending on contextual information indicating a current activity associated with the user. For instance, activity-based warm words could include music playback settings (e.g., stop, pause, volume up, volume down, etc.) that are only included in the active set of warm words while the AED 104 is streaming music for playback. Here, the contextual information would indicate the current activity of performing the long-standing operation of streaming music for playback from the AED, and thus, would cause the activity-based warm words each specifying a respective action for the digital assistant 105 to control the long-standing operation of music playback from the AED 104 to be activated. In another example, activity-based warm words could include warm words each specifying a respective action for the digital assistant 105 to perform based on context related to a current application 107 the user 102 is currently interacting with. For instance, the user 102 may be interacting with a cooking application 107 executing on a user device 50 associated with the user 102 and the activity-based warm words may relate to actions that need to be performed for a recipe (e.g., preheat oven, set timer) conveyed by the cooking application and/or actions for controlling the cooking application (e.g., next screen) 107 by speech so that the user can navigate the cooking application hands free manner. The list of warm words in the warm word preferences may include preferred warm words that the user 102 selects for inclusion in the respective active set of warm words 112A independent of any activity the user 102 is undertaking. Here, the preferred warm words are those included in the active set of warm words 112A that the user 102 desires to speak without speaking a predefined hotword to cause the AED 102 to perform a respective action specified by the warm word. Some preferred warm words could be time-sensitive such that the user 102 defines periods/times/days where the warm words should be active and included in the respective active set of warm words so that the user 102. For instance, between the times of 9-10 pm when the user 102 is getting ready for bed, the user 102 may wish to speak the warm word "set alarm" to allow the user 102 to set his/her alarm for the next morning without having to first speak a predefined hotword (e.g., Hey Computer).

The warm word preferences 212 stored for each respective enrolled user may further include acceptable false accept rate tolerances and/or acceptable false reject rate tolerances for his/her active set of warm words. These tolerances can dictate how sensitive resulting warm word models are for detecting the presence of the warm words in speech. These tolerances may be included within the enabled warm word constraints 332 received by the warm word arbitration routine 401 when enabling the final set of warm words 112F for detection by the AED 104.

FIG. 1A shows the user 102 speaking a first utterance 106, 106a, "Ok computer, play my music playlist" in the vicinity of the AED 104. The microphone 16 of the AED 104 receives the utterance 106 and processes audio data 502 (FIGS. 4 and 5) that corresponds to the utterance 106a. The initial processing of the audio data 402 may involve filtering the audio data 402 and converting the audio data 502 from an analog signal to a digital signal. As the AED 104 processes the audio data 502, the AED may store the audio data 502 in a buffer of the memory hardware 12 for additional processing. With the audio data 502 in the buffer, the AED 104 may use a hotword detector 108 to detect whether the audio data 402 includes the hotword. The hotword detector 108 is configured to identify hotwords that are included in the audio data 502 without performing speech recognition on the audio data 502.

In the hotword detector 108 is configured to identify hotwords that are in the initial portion of the utterance 106. In this example, the hotword detector 108 may determine that the utterance 106 "Ok computer, play my music playlist" includes the hotword 110 "ok computer" if the hotword detector 108 detects acoustic features in the audio data 402 that are characteristic of the hotword 110. The acoustic features may be mel-frequency cepstral coefficients (MFCCs) that are representations of short-term power spectrums of the utterance 106 or may be mel-scale filterbank energies for the utterance 106. For example, the hotword detector 108 may detect that the utterance 106 "Ok computer, play music" includes the hotword 110 "ok computer" based on generating MFCCs from the audio data 402 and classifying that the MFCCs include MFCCs that are similar to MFCCs that are characteristic of the hotword "ok computer" as stored in a hotword model of the hotword detector 108. As another example, the hotword detector 108 may detect that the utterance 106 "Ok computer, play music" includes the hotword 110 "ok computer" based on generating mel-scale filterbank energies from the audio data 402 and classifying that the mel-scale filterbank energies include mel-scale filterbank energies that are similar to mel-scale filterbank energies that are characteristic of the hotword "ok computer" as stored in the hotword model of the hotword detector 108.

When the hotword detector 108 determines that the audio data 402 that corresponds to the utterance 106 includes the hotword 110, the AED 104 may trigger a wake-up process to initiate speech recognition on the audio data 402 that corresponds to the utterance 106. For example, a speech recognizer 116 running on the AED 104 may perform speech recognition or semantic interpretation on the audio data 402 that corresponds to the utterance 106. The speech recognizer 116 may perform speech recognition on the portion of the audio data 402 that follows the hotword 110. In this example, the speech recognizer 116 may identify the words "play my music playlist" as a command 118 following the hotword 110.

In some implementations, the speech recognizer 116 is located on a server 120 in addition to, or in lieu, of the AED 104. Upon the hotword detector 108 triggering the AED 104 to wake-up responsive to detecting the hotword 110 in the utterance 106, the AED 104 may transmit the audio data 402 corresponding to the utterance 106 to the server 120 via a network 132. The AED 104 may transmit the portion of the audio data 402 that includes the hotword 110 for the server 120 to confirm the presence of the hotword 110. Alternatively, the AED 104 may transmit only the portion of the audio data 402 that corresponds to the portion of the utterance 106 after the hotword 110 to the server 120. The server 120 executes the speech recognizer 116 to perform speech recognition and returns a transcription of the audio data 402 to the AED 104. In turn, the AED 104 identifies the words in the utterance 106, and the AED 104 performs semantic interpretation and identifies any speech commands. The AED 104 (and/or the server 120) may identify the command for the digital assistant 105 to perform the long-standing operation of "play music". In the example shown, the digital assistant 105 begins to perform the long-standing operation of playing music 122 as playback audio from the speaker 18 of the AED 104. The digital assistant 105 may stream the music 122 from a streaming service (not shown) or the digital assistant 105 may instruct the AED 104 to play music stored on the AED 104.

The AED 104 (and/or the server 120) may include an operation identifier 124 configured to identify one or more long-standing operations the digital assistant 105 is currently performing. For each long-standing operation the digital assistant 105 is currently performing, the warm word selector 400 via the warm word arbitration routine 401 may select, for inclusion in the final set of warm words 112F, a corresponding set of one or more warm words 112 each associated with a respective action for controlling the long-standing operation. In some examples, the warm word selector 400 accesses the warm word preferences 212 from the enrolled user data/information for enrolled users 200 of the AED 104 (e.g., stored on the memory hardware 12) or another registry or table that associates the identified long-standing operation with a corresponding set of one or more warm words 112 that are highly correlated with the long-standing operation. For example, if the long-standing operation corresponds to a set timer function, the associated set of one or more warm words 112 available the warm word selector 126 to activate includes the warm word 112 "stop timer" for instructing the digital assistant 105 to stop the timer. Similarly, for the long-standing operation of "Call [contact name]" the associated set of warm words 112 includes a "hang up" and/or "end call" warm word(s) 112 for ending the call in progress. In the example shown, for the long-standing operation of playing music 122, the associated set of one or more warm words 112 available for the warm word selector 126 to activate includes the warm words 112 "next", "pause", "previous", "volume up", and "volume down" each associated with the respective action for controlling playback of the music 122 from the speaker 18 of the AED 104. Accordingly, the warm word selector 400 may determine to include these warm words 112 in the final set of warm words 112F enabled for detection by the AED 104 while the digital assistant 105 is performing the long-standing operation and may disable these warm words 112 once the long-standing operation ends. Similarly, the warm word arbitration routine 401 may enable/disable different warm words 112 depending on a state of the long-standing operation in progress. For example, if the user speaks "pause" to pause the playback of music 122, the warm word arbitration routine 401 may add a warm word 112 for "play" into the final set of warm words 112F to resume the playback of the music 122. In some configurations, instead of accessing a registry or the warm word preferences 212 from the enrolled user data/information for enrolled users 200, the warm word selector 400 examines code associated with an application of the long-standing operation (e.g., a music application running in the foreground or background of the AED 104) to identify any warm words 112 that developers of the application want users 102 to be able to speak to interact with the application and the respective actions for each warm word 112.

In some implementations, after adding the warm words 112 correlated with the long-standing operation for inclusion in the final set of warm words 112F enabled for detection, the digital assistant 105 associates these warm words 112 with only the user 102 that spoke the utterance 106 with the command 118 for the digital assistant 105 to perform the long-standing operation. That is, the digital assistant 105 configures a portion of the warm words 112 in the final set of warm words 112F to be speaker-specific such that they are dependent on a speaking voice of the particular user 102 that provided the initial command 118 to initiate the long-standing operation. As will become apparent, by depending warm words 112 on the speaking voice of the particular user 102a, the AED 104 (e.g., via the digital assistant 105) will only perform the respective action specified by the one of the warm words 112 when the warm word is spoken by the particular user 102, and thereby suppress performance (or at least require approval from the particular user 102) of the respective action when the warm word 112 is spoken by a different speaker.

Figure 5:
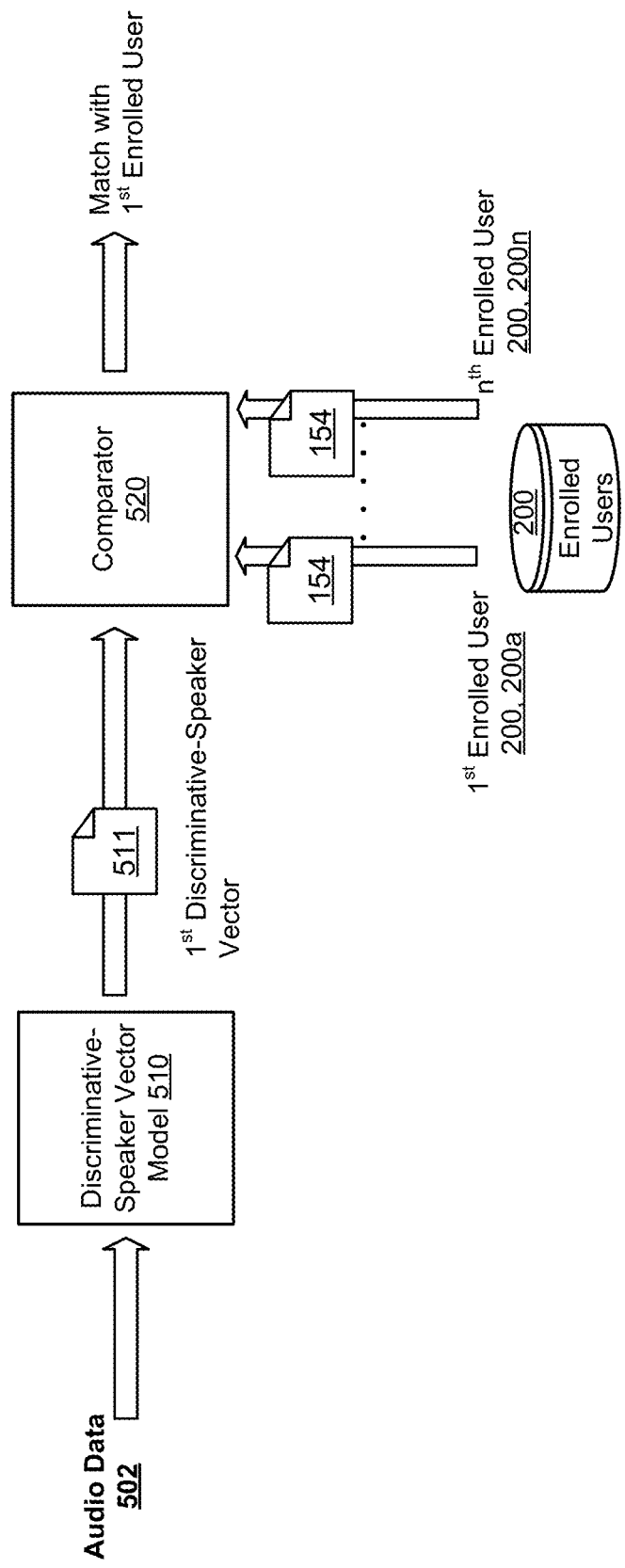
FIG. 5 is a schematic view of a speaker identification process.

Referring to FIG. 5, in some examples, the user detector 410 resolves the identity of the user 102 that spoke the utterance 106 by performing a speaker identification process 500. The speaker identification process 500 may execute on the data processing hardware 12 of the AED 104. The process 500 may also execute on the server 120. The speaker identification process 500 identifies the user 102 that spoke the utterance 106 by first extracting, from the audio data 502 corresponding to the utterance 106 spoken by the user 102, a first speaker-discriminative vector 511 representing characteristics of the utterance 106. Here, the speaker identification process 500 may execute a speaker-discriminative model 510 configured to receive the audio data 502 as input and generate, as output, the first speaker-discriminative vector 511. The speaker-discriminative model 510 may be a neural network model trained under machine or human supervision to output speaker-discriminative vectors 511. The speaker-discriminative vector 511 output by the speaker-discriminative model 510 may include an N-dimensional vector having a value that corresponds to speech features of the utterance 106 that are associated with the user 102. In some examples, the speaker-discriminative vector 511 is a d-vector.

Once the first speaker-discriminative vector 511 is output from the model 510, the speaker identification process 500 determines whether the extracted speaker-discriminative vector 511 matches any of the enrolled speaker vectors 154 stored on the AED 104 (e.g., in the memory hardware 12) for enrolled users 200a-n (FIG. 2) of the AED 104. As described above with reference to FIG. 2, the speaker-discriminative model 510 may generate the enrolled speaker vectors 154 for the enrolled users 200 during a voice enrollment process. Each enrolled speaker vector 154 may be used as a reference vector corresponding to a voiceprint or unique identifier representing characteristics of the voice of the respective enrolled user 200.

In some implementations, the speaker identification process 500 uses a comparator 520 that compares the first speaker-discriminative vector 511 to the respective enrolled speaker vector 154 associated with each enrolled user 200a-n of the AED 104. Here, the comparator 520 may generate a score for each comparison indicating a likelihood that the utterance 106 corresponds to an identity of the respective enrolled user 200, and the identity is accepted when the score satisfies a threshold. When the score does not satisfy the threshold, the comparator may reject the identity. In some implementations, the comparator 520 computes a respective cosine distance between the first speaker-discriminative vector 511 and each enrolled speaker vector 154 and determines the first speaker-discriminative vector 511 matches one of the enrolled speaker vectors 154 when the respective cosine distance satisfies a cosine distance threshold.

In some examples, the first speaker-discriminative vector 511 is a text-dependent speaker-discriminative vector extracted from a portion of the audio data that includes the hotword 110 and each enrolled speaker vector 154 is also text-dependent on the same hotword 110. The use of text-dependent speaker vectors can improve accuracy in determining whether the first speaker-discriminative vector 511 matches any of the enrolled speaker vectors 154. In other examples, the first speaker-discriminative vector 511 is a text-independent speaker-discriminative vector extracted from the entire audio data that includes both the hotword 110 and the command 118 or from the portion of the audio data that includes the command 118.

When the speaker identification process 500 determines that the first speaker-discriminative vector 511 matches one of the enrolled speaker vectors 154, the process 500 identifies the user 102 that spoke the utterance 106 as the respective enrolled user 200 associated with the one of the enrolled speaker vectors 154 that matches the extracted speaker-discriminative vector 511. In the example shown, the comparator 520 determines the match based on the respective cosine distance between the first speaker-discriminative vector 511 and the enrolled speaker vector 154 associated with the first enrolled user 200a satisfying a cosine distance threshold. In some scenarios, the comparator 520 identifies the user 102 as the respective first enrolled user 200a associated with the enrolled speaker vector 154 having the shortest respective cosine distance from the first speaker-discriminative vector 511, provided this shortest respective cosine distance also satisfies the cosine distance threshold.

Conversely, when the speaker identification process 500 determines that the first speaker-discriminative vector 511 does not match any of the enrolled speaker vectors 154, the process 500 may identify the user 102 that spoke the utterance 106 as a guest user of the AED 104. Accordingly, the user detector 410 may associate the activated set of one or more warm words 112 with the guest user and use the first speaker-discriminative vector 511 as a reference speaker vector representing the speech characteristics of the voice of the guest user. In some instances, the guest user could enroll with the AED 104 and the AED 104 could store the first speaker-discriminative vector 511 as a respective enrolled speaker vector 154 for the newly enrolled user.

In the example shown in FIG. 1A, the AED 104 notifies the identified user 102 (e.g., Barb) associated with the respective active set of warm words 112A for controlling the long-standing operation that the warm words 112 are enabled and that the user 102 can speak any of the warm words 112 to instruct the AED 104 to perform the respective action for controlling the long-standing operation. For instance, the digital assistant 105 may generate synthesized speech 123 for audible output from the speaker 18 of the AED 104 that states, "Barb, you may speak music playback controls without saying 'Ok computer'. In additional examples, the digital assistant 105 may provide a notification to a user device 50 (e.g., smart phone) linked to the user account of the identified user to inform the identified user 102 (e.g., Barb) which warm words 112 are currently active for controlling the long-standing operation.

Figure 3:
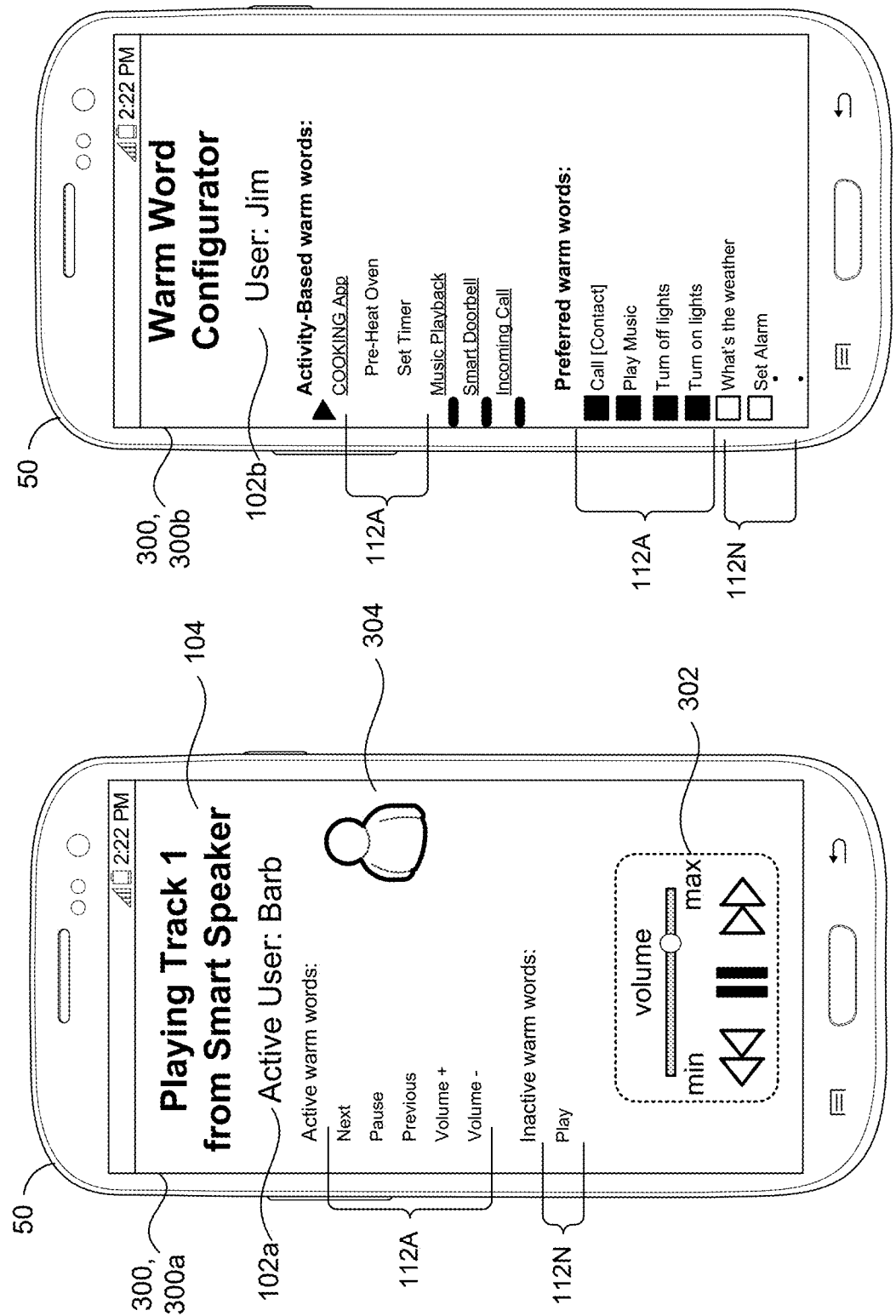
FIGS. 3A and 3B are example graphical user interfaces (GUIs) rendered on a screen of a user device.

Referring to FIG. 3A, a graphical user interface (GUI) 300, 300a executing on the user device 50 may display the enabled warm words 112 and associated respective actions for controlling the long-standing operation. Notably, the GUI 300a of FIG. 3A depicts the presentation of a screen related to controlling a long-standing operation initiated by a user 102a, and therefore, presents only the warm words and associated actions related to control of the long-standing operation in progress. Thus, there may be additional warm words in the respective activated set of warm words 112A for the user 102. For instance, FIG. 1A also shows the warm words 112 'Call [Contact]', 'Turn off lights', and 'Turn on lights' included in the respective active set of warm words 112A for the user 102a, albeit not related to the long-standing operation of playback of Barb's music playlist. Each warm word itself may serve as a descriptor identifying the respective action. FIG. 3A provides an example GUI 300a displayed on a screen of the user device 50 to inform the user 102 which warm words 112 are active for that user 102 to speak to control the long-standing operation, and which warm words 112N are not enabled or simply inactive/disabled, and thus, unavailable for controlling the long-standing operation when spoken by the user 102. Specifically, the GUI 300a renders the active warm words 112 "next", "pause", "previous", "volume up", and "volume down," and the not enabled warm word 112N "play". If the user 102 were to pause playback of the music, the warm word for "play" may become an active warm word 112 and the warm word for "pause" may become an inactive warm word 112N. Each warm word 112 is associated with the respective action for controlling playback of the music 122 from the speaker 18 of the AED 104.

Additionally, the GUI 300a may render for display an identifier of the long-standing operation (e.g., "Playing Track 1"), an identifier of the AED 104 (e.g., smart speaker) that is currently performing the long-standing operation, and/or an identity of the active user 102 (e.g., Barb) that initiated the long-standing operation. In some implementations, the identity of the active user 102 includes an image 304 of the active user 102. Accordingly, by identifying the active user 102 and the active warm words 112, the GUI 300a reveals the active user 102 as a "controller" of the long-standing operation that may speak any of the active warm words 112 displayed in GUI 300a to perform a respective action for controlling the long-standing operation. As mentioned above, the warm words in the active set of warm words 112 related to controlling the long-standing operation may optionally be dependent on the speaking voice of Barb 102, since Barb 102 seeded the initial command 118 "play music," to initiate the long-standing operation. By depending the active set of warm words 112 on the speaking voice of Barb 102, the AED 104 (e.g., via the digital assistant 105) will only perform a respective action associated with one of the warm words 112 when the warm word 112 is spoken by Barb 102, and will suppress performance (or at least require approval from Barb 102) of the respective action when the warm word 112 is spoken by a different speaker.

The user device 50 may also render graphical elements 302 for display in the GUI 300a for performing the respective actions associated with the respective active warm words 112 to playback of the music 122 from the speaker 18 of the AED 104. In the example shown, the graphical elements 302 are associated with playback controls for the long-standing operation of playing music 122, that when selected, cause the device 50 to perform a respective action. For instance, the graphical elements 302 may include playback controls for performing the action associated with the warm word 112 "next," performing the action associated with the warm word 112 "pause," performing the action associated with the warm word 112 "previous," performing the action associated with warm word 112 "volume up," and performing the action associated with the warm word 112 "volume down." The GUI 300a may receive user input indications via any one of touch, speech, gesture, gaze, and/or an input device (e.g., mouse or stylist) to control the playback of the music 122 from the speaker 18 of the AED 104. For example the user 102 may provide a user input indication indicating selection of the "next" control (e.g., by touching the graphical button in the GUI 300a that universally represents "next") to cause the AED 104 to perform the action of advancing to the next song in the playlist associated with the music 122.

Referring to FIG. 3B, a GUI 300, 300b executing on the user device 50 (or the AED 104) of the second user 102b (e.g., Jim) displays a warm word configurator screen that allows the user 102b to select which warm words 112 to add to the user's 102b respective active set of warm words 112A, 112Ab (FIGS. 1A-1C). In the example shown, the GUI 300b presents a list of available warm words 112 displayed as respective graphical elements that may be selected to add or remove the corresponding available warm word to the respective active set of warm words 112A that the user wants the AED 104 to detect, and ultimately perform the respective action specified by the corresponding warm word, when spoken by the user 102b. The GUI 300b provides the ability to select activity-based warm words that the user 102b wants to activate by adding to the respective active set of warm words 112A when the user 102b is undertaking a particular activity. Here, the particular activity may be ascertained based on a current application executing on the user device 50 or AED 104 that the user 102b is interacting with. For instance, the warm word configurator screen presented by the GUI 300b may provide a list of applications loaded on the user device 50 and list, for each corresponding application, available activity-based warm words that the user 102 may select to add to the respective active set of warm words 112A when the user 102 is interacting with the corresponding application. A non-exhaustive list of applications each having available activity-based warm words may include a cooking application and a music player application. In the example shown, the user may select the activity-based warm words 'pre-heat oven', and 'set timer' that may be added to the respective active set of warm words 112Ab for the user 102b when the user 102 is interacting with the cooking application. For instance, in FIG. 1A the user may be viewing a recipe in the cooking app for baking deboned chicken, and when the user is viewing recipe preparation steps the activity-based warm words 'pre-heat oven' may be added to the respective active set of warm words 112Ab. Here, the digital assistant 105 instructs a smart oven to turn-on and pre-heat when the user 102b when the AED 104 detects the warm word 'pre-heat oven' in audio data characterizing an utterance spoken by the user 102b and captured by the AED 104. Notably, and as described in greater detail below, the warm word arbitration routine 401 must affirmatively choose to enable the warm word 'pre-heat oven' as one of the final set of warm words 112F in order to permit the AED 104 to detect the warm word in audio data and perform the respective action.

With continued reference to the GUI 300b of FIG. 3B, FIG. 1B shows that the activity warm word 'set timer' may be added to the respective active set of warm words 112Ab once the temperature of the smart oven is successfully pre-heated. Here, the AED 104 may receive an ambient context signal 440 from the smart oven that indicates that the smart oven is at a designated pre-heated temperature, thereby triggering the AED 104 to add the activity-based warm word 'set timer' to, and remove the activity-based warm word 'pre-heat even' from, the respective active set of warm words 112Ab for the user 102b. Notably, and as described in greater detail below, the addition and removal of the warm words 'set timer' and 'pre-heat oven' to and from the respective active set of warm words 112Ab for the second user 102b may trigger the warm word selector 400 to again execute the warm word arbitration routine 401 to determine whether to add the warm word 'set timer' to the final set of warm words 112F enabled for detection by the AED 104. In the example shown in FIG. 1B, the AED 104 outputs a notification indicating once the smart oven is successfully preheated. For instance, the digital assistant 105 may generate synthesized speech 123 for audible output from the speaker 18 of the AED 104 that states, "Oven Reached 350-deg'". In additional examples, the digital assistant 105 may provide a notification to a user device 50 (e.g., smart phone) linked to user account of the identified user to inform the identified user 102b (e.g., Jim) when the warm word 'pre-heat oven' has been added by the warm word selector 400 to the final set of warm words 112F enabled for detection by the AED 104.

The GUI 300b of FIG. 3B also shows the option for the user to select other activity-based warm words for activities related to a smart doorbell and incoming calls. For instance, and as shown in FIG. 1B, the smart doorbell may be designated activity-based warm words such as 'Show Cam', 'Ignore', and 'Talk' under visitor presence conditions such as when a visitor rings the smart doorbell and/or the smart doorbell detects the presence of a visitor proximate to the smart door bell. Under one or more of the visitor presence conditions, these activity-based warm words may be added to the respective active set of warm words 112A for each user 102 that selected to include these activity-based warm words, e.g., via use of the warm word configurator screen presented by GUI 300b. The smart doorbell may send an ambient context signal 440 (FIG. 4) to the AED 104 that indicates the occurrence of one or more visitor presence conditions, whereby the AED 104 may sound a visitor notification 125 such as a doorbell chime for audible output from the speaker 18 of the AED 104. The AED 104 may provide the visitor notification 125 as synthesized speech in addition to, or in lieu of, the doorbell chime. At the same time, the ambient context signal 440 may trigger the warm word selector 400 to execute the warm word arbitration routine 401 that determines to add the activity-based warm words 'Show Cam', 'Ignore', and 'Talk' to the final set of warm words 112F enabled for detection by the AED 104. Accordingly, and in the example of FIG. 1B, any of the users 102a-c can speak (without speaking a predefined hotword) 'Show Cam' to cause a screen in communication with the AED 104 to display image data of the visitor captured by a camera of the smart doorbell or proximate the smart doorbell, 'Ignore' to choose to dismiss the visitor notification (and optionally cause the smart doorbell to relay a pre-recorded message to the visitor), or 'Talk' to open a microphone in communication with the smart doorbell and the microphone 16 of the AED 104 (and/or microphone 52 of user device 50) to provide intercom communication capabilities between the users 102 and the visitor.

With continued reference to FIG. 3B, the warm word configurator screen also shows a list of preferred warm words that the user 102b may select for inclusion in the respective active set of warm words 112A independent of activity. In the example shown, the user 102b selects the warm words 'Call [Contact]', 'Play Music', and 'Turn off lights', 'Turn on lights' as preferred warm words to add the active set of warm words 112A, 112Ab. The list of preferred warm words may be prepopulated or based on commonly used voice commands learned over time that the digital assistant 105 promotes to warm words. Some of the preferred warm words may be custom words or phrases that the user assigns to a respective action (e.g., a routine) to be performed when spoken by the user. In the example shown, the warm words 'What's the weather' and 'Set Alarm' are listed as preferred warm words but indicated as inactive warm words 112N since the user 102b did not select to add these warm words to the respective active list of warm words 112A. The list of preferred warm words and activity-based warm words selected for inclusion in the respective active set of warm words 112A may be saved in the respective warm word preferences 212 for each enrolled user 200.

Referring back to FIGS. 1A-1C and FIG. 4, the associated user device for a user 102 detected in the environment by the user detector 410 may push/broadcast the user's 102 respective active set of warm words 112A periodically and/or each time warm words are added or removed from the active set. Here, the user device may push/broadcast the respective active set of warm words 112A from a respective user device 50 in communication with the AED 50. Additionally or alternatively, the warm word selector 400 may obtain the active set of warm words 112A by accessing the warm word preferences 212 when the user detector 410 uniquely identifies the user as one of the enrolled users 200. In some examples, the warm word selector 400 determines when warm words are added to active sets of warm words 112A for different users responsive to receiving an ambient context signal 440 indicating a particular activity is currently in progress and the particular activity is assigned to one or more activity-based warm words conveyed in the warm word preferences 212. The warm word selector 400 may obtain the active set of warm words 112 using other techniques such as prompting the detected user to provide his/her active set of warm words.

Referring to FIG. 4, in some implementations, the warm word selector 400 executes the warm word arbitration routine 401 for enabling a final set of warm words 112F for detection by the AED 104 based on the active set of warm words 112A obtained for each user 102 among the multiple users 102 detected by the user detector 401. The warm word selector 400 may execute the warm word arbitration routine 401 periodically during prescribed intervals and/or responsive to specific events/conditions. In some examples, the warm word arbitration routine 401 executes in response to determining addition of a new warm word to, or removal of one of the warm words from, the respective active set of warm words 112A for one of the multiple different users present in the environment. To illustrate, FIG. 1B shows the first user 102a (e.g., Barb) speaking a second utterance 106, 106b, "Ok computer, stop music and start commute routine when I get in the car" in the vicinity of the AED 104. The microphone 16 of the AED 104 receives the utterance 106b and processes the audio data 502 to detect the hotword 110 using the hotword detector 108, thereby causing the AED 104 to wake-up and perform speech recognition to recognize the command to stop the music and perform the action of starting Barb's commute routine once Barb is in her car. As a result of the command 118 causing the digital assistant 105 to stop the long-standing operation of playing back the music 122 from Barb's playlist, the music playback warm words of pause, next song, previous song, volume up, and volume down are now removed from the respective active set of warm words 112Aa for Barb. In this example, the warm word selector 400 receives the respective active set of warm words 112Aa for Barb which has been updated to now omit the music playback warm words, thereby triggering execution of the warm word arbitration routine 401 to potentially update the final set of warm words 112F enabled for detection by the AED. Similarly, the addition of the activity-based warm words 'Show Cam', 'Ignore', and 'Talk' to the respective active set of warm words 112Aa-Ac for each of the users 102a-c may trigger the warm word selector 400 to execute the warm word arbitration routine 401.

In some examples, the warm word arbitration routine 401 executes in response to the user detector 410 detecting the presence of a new user within the environment of the AED 104. Notably, since the AED obtains a respective active set of warm words 112A for any new user detected, the warm word arbitration routine 401 executes to determine whether the final set of warm words 112F should be updated to include any of the active warm words for the new user. By the same notion, updating the final set of warm words 112F may include removing some warm words from the final set to make room (i.e., in terms of processing/memory capability and/or false acceptance thresholds) for any of the new active warm words for the new user.

Additionally or alternatively, the warm word arbitration routine 401 may execute in response to the AED 104 determining that one of the previously detected users is no longer present within the environment of the AED 104. For instance, FIG. 1C shows that the first user 102a is no longer present in the environment. The user detector 410 may continuously update a list of users whom are currently detected in the environment of the AED 104, thereby allowing the AED 104 to ascertain when a user is no longer present.

In some implementations, the AED 104 determines a change in ambient context and the warm word arbitration routine 401 executes in response to determining the change in ambient context. In some examples, the warm word selector 400 receives the ambient context signal 440 from a source indicating the change in ambient context. For example, the smart doorbell may provide the ambient context signal 440 indicating the occurrence of one or more visitor presence conditions and the oven could provide the ambient context signal 440 when the oven has reached the pre-heated temperature. An incoming call to one or more enrolled users 200 of the AED 104 could also serve as an ambient context signal 440 that causes the warm word arbitration routine 401 to potentially update the final set of warm words 112F to include new warm words related to the incoming phone call event such as, without limitation, warm words such as 'answer' or 'ignore' that when spoken would cause the AED 104 to answer or ignore the incoming call.

Execution of the warm word arbitration routine 401 may include obtaining enabled warm word constraints 430 and determining a number of warm words to enable in the final set of warm words 112F for detection by the AED 104 based on the enabled warm word constraints 430. The warm word constraints 430 may permit the warm word arbitration routine 401 to determine a warm word capacity for the AED 104 at any given time. The warm word constraints 430 may include at least one of memory and computing resource availability of the AED 104 for detection of warm words, computational requirements for enabling each warm word in the respective active set of warm words 112A for each user of the multiple users present in the environment of the AED, an acceptable false accept rate tolerance, or an acceptable false reject rate tolerance. The acceptable false accept and reject rate tolerances could be based on global settings, device settings, or be user-defined on a per-user basis. In some examples, the acceptable false accept and reject rate tolerances can be dynamic where a fading of warm word detection sensitivity occurs when a user is less active or further from the device.

The memory and computing resource availability may take into account whether the AED 104 is battery powered, and if so, the current capacity of the battery. The memory and computing resource availability may further take into account current warm words in the final set of warm words, account applications currently running on the AED 104 in addition to processing capabilities and storage capacity.

The computation requirements may determine memory and processing resources required to execute a respective warm word model associated with each warm word in the active sets of warm words 112A. For instance, the computational requirements could include warm word model size/parameters for each warm word as well as whether any of the warm words are speaker specific requiring performance of speaker id process 500. Additionally or alternatively, the computational requirements may determine memory and processing resources required to execute the speech recognizer 116 in a low-power mode sufficient for only recognizing utterances of the warm words. Notably, a low acceptable false accept rate tolerance may require more processing of a respective warm word model for detecting a warm word than a higher acceptable false accept rate tolerance.

In some implementations, execution of the warm word arbitration routine 401 includes ranking the warm words in the respective active set of warm words from highest priority to lowest priority for each corresponding user 102 of the multiple users 102 based on warm word prioritization signals 413 and enabling the final set of warm words 112F for detection by the AED 104 based on the rankings of the warm words in the respective active sets of warm words 112A for each corresponding user 102. Here, the warm word prioritization signals 413 may include at least one of usage frequency by the corresponding user of each warm word in the respective active set of warm words 112A, a current state of the AED 104, ambient context of the AED 104, or co-presence information indicating prior warm word usage and/or operations performed by the AED when the corresponding user was previously present in the environment with one or more combinations of other ones of the multiple users. The current state of the AED may include any long-standing operations the digital assistant is currently performing on the AED 104. For instance, if the digital assistant is playing back music on a highest volume setting the prioritization signal 413 may cause the warm word arbitration routine 401 to rank the warm words 'play' and 'volume up' in the active set of warm words 112A with a low priority since it is unlikely the user will speak these warm words. The ambient context may include activity recognition performed by the AED based on one or more signals. For instance, FIG. 1A depicts the third user 102c watching a movie with his/her headphones on and having enabled a do not disturb mode on his/her user device 50. The routine 401 may determine a user context for the user 103c based on image data 412 received from the camera 19 (or another camera) indicating the user is wearing headphones and looking away from the AED 104 and/or a communication signal received from the user device 50 (or headphones) indicating the "do not disturb" mode is enabled on the user device. If enabled, headphones may also communicate signals indicating the headphones are currently worn and playing back audio content. The user context for the user 102c may additionally or alternatively be ascertained based on a signal received indicating a movie is in progress. As a result, the routine 401 may rank the respective active set of warm words 112A for the user 103c with a lower priority than the active sets of warm words 112Aa, 112Ab for the first and second users 102a, 102b. However, as shown in FIG. 1B, the third user 103c may permit visitor alert notifications while the do not disturb mode is enabled such that the ambient context signals 440 indicating the visitor is at the doorbell causes the digital assistant 105 to output a visitor alert audibly from user's headphones and/or visually by displaying a graphic on the user device 50 or television the user 103c is currently viewing to inform the user 102c of the visitor. Thus, while the respective active set of warm words 112Ac are ranked with a low priority under the conditions of FIG. 1A and not included (except for "Call [Contact]" which is also active for the other users 102a, 102b) in the final set of warm words, the visitor alert served to the third user 102c in FIG. 1B may change the current user context for the user 102c to now indicate that the third user 102c may be interested in interacting with the digital assistant 105 to ascertain information about the visitor at the doorbell. As shown in FIG. 1B, the warm words 'Show Cam', 'Ignore', and 'Talk' are included and ranked highest in the active sets of warm words 112Aa-Ac for all of the users 102a-c and ultimately selected for inclusion in the final set of warm words 112F enabled for detection by the AED 104.

The co-presence information may indicate how warm words are utilized by the corresponding user in the presence of other users. For instance, the first user 102a and the second user 102b may each often speak the warm word "play music" in the presence of one another, whereas the first user 102a seldom speaks the warm word 'play music' in the presence of the third user 102c.

The arbitration routine 401 may select higher priority warm words from the ranked active sets of warm words for all of the users 102 for inclusion in the final set of warm words 112F to enable for detection by the AED 104. As mentioned previously, the number of warm words included in the final set of warm words 112F is limited by the enabled warm word constraints 430. In some examples, to optimize execution of the arbitration routine 401, the arbitration routine 401 considers only warm words from the top-N warm words in the respective active set of warm words 112A ranked for each user. The value of N may be fixed or variable for different users. In examples implementing values of N that are variable among the different sets of users, the routine 401 may determine a warm word affinity score for each corresponding user 102 among the multiple users and enable the final set of warm words based on the warm word affinity score. The warm word affinity score for each corresponding user 102 may be based on a frequency of warm word usage by the corresponding user 102 and/or frequency of interactions between the corresponding user 102 and the digital assistant 105. Here, frequency of warm word usage may indicate how often the corresponding user 102 uses warm words when interacting with the digital assistant 105, while the frequency of interactions may indicate how often the corresponding user 102 interacts with the digital assistant 105 generally. The frequency of warm word usage and/or interactions may be further constrained by a current duration that the presence of the corresponding user 102 is detected within the environment of the AED 104, specific days of the week and/or times of day. For instance, a user may frequently ask "What's the weather" every morning around the same time. The warm word affinity score may additionally or alternatively be based on at least one of a duration of presence of the corresponding user 102 in the environment of the AED 104, a proximity of the corresponding user 102 relative to the AED 104, or a current user context. For instance, proximity information 54 for a corresponding user may cause the arbitration routine 401 to assign a higher priority to warm words in the respective active sets of warm words for users closer to the AED 104 than other users since closer users may be more likely to interact with AEDs than users further away.

In the examples of FIGS. 1A and 1B depicting the third user 103c watching the movie with his/her headphones on and having enabled the do not disturb mode on his/her user device 50, the warm word arbitration routine 401 may determine a lower affinity score for the third user 103c than the other users 103a, 103b since the current context of the user 102c indicates a low likelihood that the user 103c will interact with the digital assistant 103 and the proximity information 58 indicates the third user 103c is located relatively far away from the AED 104 compared to the other users. Moreover, the affinity score for the first user 102a may be further boosted if the first user 102c subsequently uses one of the music playback warm words after issuing the command 118 to "play my music playlist" in the first utterance 106a. Similarly, the affinity score for the second user 102b may be boosted if the user 102b frequently makes use of the warm word "pre-heat oven" while viewing a recipe in the cooking application 107 as shown in FIG. 1A. By the same notion, the ranking of the warm word 'Set Timer' in the respective active set of warm words is higher in FIG. 1B after the oven reaches the preheat temperature since there is now a higher likelihood that the user 102b will put a dish in the oven and set the timer for the duration the dish is to bake in the oven. In FIG. 1B, the 'preheat oven' warm word is now ranked lowest in the respective active set of warm words 112Ab for the second user 102c.

To illustrate how a combination of current user context and proximity affect the warm word affinity score for the third user 102b, the current user context and proximity for the third user 102c in FIG. 1A associate the third user 102c with a low affinity score while the event of the visitor notification 125 in FIG. 1B associates the second user 102b with a slightly higher affinity score. However, in FIG. 1C, the proximity information 58 now indicates the third user 102c has moved closer to the AED 104 and the current user context now indicates the do not disturb mode is disabled and the user is no longer wearing his/her headphones. As a result, the arbitration routine 401 may increase the affinity score for the third user 102c since there is a higher likelihood of the user 102c interacting with the digital assistant 105 compared to the example depicted in FIG. 1B and especially the example depicted in FIG. 1A.

In addition to duration of presence, the arbitration routine 401 may further predict an expected likelihood of user presence in the future and determine the affinity score based on the expected likelihood of user presence. For instance, when the operation identifier 124 determines that the transcription output from the speech recognizer 116 for the second utterance 106b includes the command 118 ' . . . stop music and start commute routine when I get in the car', the arbitration routine 401 may predict that the presence of the user 102a in the environment will likely end. As a result, the arbitration routine may start gradually reducing the affinity score for the first user 102a until the first user 102a is no longer detected as shown in FIG. 1C.

With continued reference to FIGS. 1A-1C and 4, the warm word arbitration routine 401 may boost the scores for warm words shared by two or more of the active sets of warm words 112A since there is an increased likelihood of these warm words being spoken. These shared warm words may be ranked higher in the respective active sets of warm words 112A so that they are not inadvertently omitted from the top-N active warm words as discussed above. Additionally, the associated warm word models for detecting these shared warm words among multiple users may be merged with one another to limit the number of similar warm word detection models executing on the AED 104. Moreover, a warm word that is shared by different users may cause the digital assistant 105 to perform a different action depending on which user spoke the warm word 112. For instance, in the example of FIG. 1C, the second user 102b speaking "play music" enabled for detection in the final set of warm words may cause the digital assistant 105 to stream music from a first music player indicated as a preferred music player for the second user 102b. By contrast, the third user 102c speaking the same warm word "play music' may cause the digital assistant 105 to stream music from a different second music player preferred by the third user 102c. Notably, the speaker identification process 500 of FIG. 5 may be performed on audio data 502 characterizing utterances of the warm word in order to uniquely identifier the user that spoke the warm word so that the appropriate action (e.g., choosing which music player to stream music) can be performed by the digital assistant 105. In this example, warm word arbitration routine 401 identifies that the respective active sets of warm words 112Ab, 112Ac each include the warm word 112 "play music". Rather than enable detection for two separate warm word models 330 for the warm word 112 "play music", the warm word arbitration routine selects only one warm word model 330 for the warm word 112 "play music". In some implementations, the warm word arbitration routine 401 determines that the AED 104 has sufficient capacity and enables execution of a higher quality (i.e., additional parameters, additional operations, decreased latency, and/or increased sensitivity) warm word model 330 for the warm word 112 "play music". Optionally, the warm arbitration routine 401 determines the AED 104 has sufficient capacity and enabled execution of a different architecture such as moving from a warm word model 330 to an ASR model.

Referring to FIG. 1C, the first user 102a is no longer detected and the affinity score for the third user 102c is further boosted due to the third user 102c moving closer to the AED 104 and no longer wearing headphones. Additionally, the playback of the first user's 102a music playlist has been stopped. As a result, the final set of warm words 112F enabled for detection include the warm words "tell me a joke", "set a timer", "play music", "call [contact]", and "turn off lights". The "tell me a joke" warm word may be speaker specific to the third user 102c and selected from the respective active set of warm words 112Ac for the third user 102c while the "set a timer" warm word may be speaker specific to the second user 102b and selected from the respective active set of warm words 112Ab for the second user 102b. The warm words "play music", "call [contact]", and "turn off lights" are shared warm words that may be spoken by either of the users 102b, 102c to cause the respective action specified by the warm word to be performed by the digital assistant 105 when detected by the AED 104 in streaming audio (e.g., using the appropriate warm word model 330 or speech recognizer 116) without inclusion of a predetermined hotword (e.g., Ok Computer). In the example, the third user 102c speaks a third utterance 106, 106c that includes a warm word 112 "tell me a joke" from the final set of warm words 112F enabled for detection by the AED 104. Without performing speech recognition on the captured audio, the AED 104 may apply the warm word models 330 for the final set of warm words 112F to identify whether the utterance 106c includes any of the warm words included in the final set of warm words 112F. The AED 104 compares the audio data 502 that corresponds to the utterance 106c to the enabled warm word models 330 that correspond to the warm words 112 "tell me a joke", "set a timer", "play music", "call [contact]", and "turn off lights" and determines that the warm word model 330 enabled for the warm word 112 "tell me a joke" detects the warm word 112 "tell me a joke" in the utterance 102c without performing speech recognition on the audio data 402. Most notably, the user speaks the utterance 106c of the warm word 112 without prefixing the utterance 106c with a predetermined hotword 110 such that the appropriate warm word model 330 detects the presence of the warm word 112 in the audio data and triggers the AED 104 to invoke the digital assistant 105 to perform the action (e.g., retrieve and playback a joke) specified by the warm word. In some examples, the speech recognizer 116 operates in a low-power mode for recognizing only the presence of warm words 112 in the final set of warm words 112F. In these examples, the speech recognizer 116 may recognize when one of the warm words in the final set of warm words 112F is spoken not in the presence of a predefined hotword and invoke the digital assistant to perform the respective action. In the example, the digital assistant 105 retrieves a joke from a search engine, on-device application, or other source and outputs the joke audibly as synthesized speech 129. The digital assistant 105 may additionally or alternatively output the joke as a textual representation displayed on a screen 13 of the AED 104 or other screen in communication with the AED 104.

Figure 6:
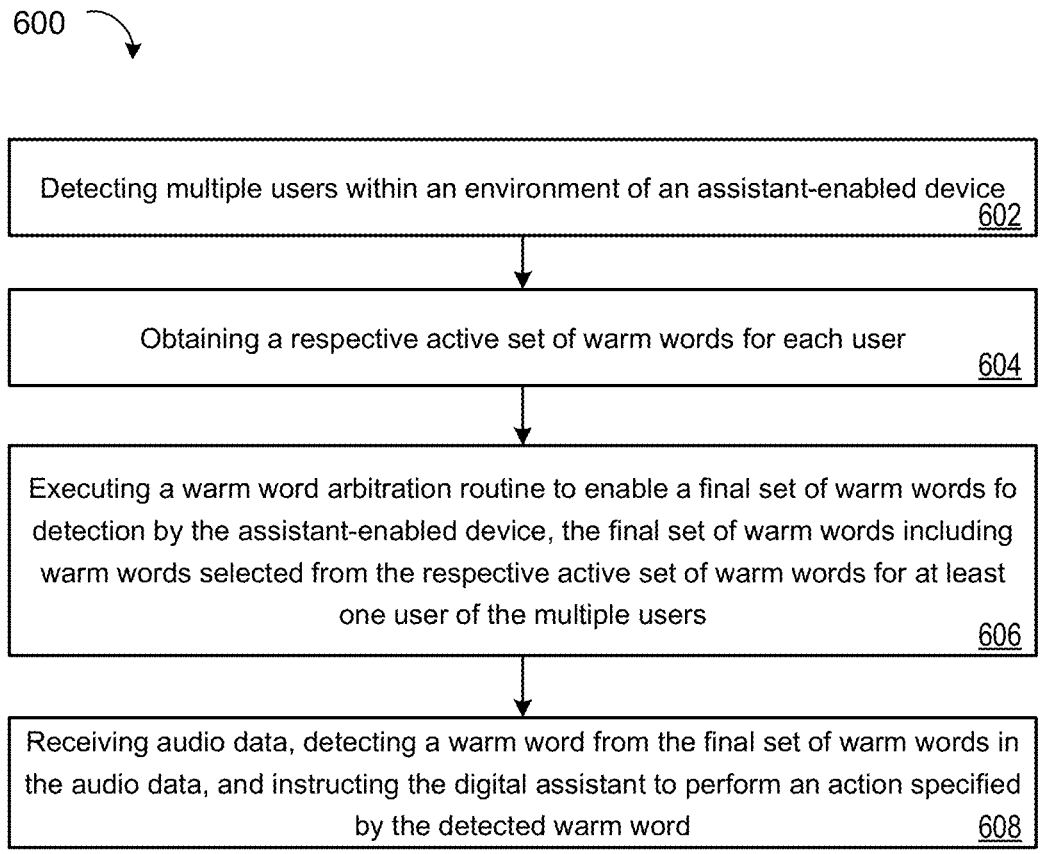
FIG. 6 is a flowchart of an example arrangement of operations for a method of enabling a final set of warm words for detection on an assistant-enabled device when a presence of multiple users is detected in an environment of the assistant-enabled device.

FIG. 6 includes a flowchart of an example arrangement of operations for a method 600 of enabling a final set of warm words 112F for detection by an assistant-enabled device (AED) 104 when multiple users 102 are present in an environment of the AED 104. The operations performed by the method 600 may be described with reference to FIGS. 1-5. As used throughout the present disclosure, the "environment" of the AED 104 refers to users within a proximity for interacting with the AED through speech and optionally other means. Accordingly, the "environment" may include a same room or even household as the AED, a vehicle cabin, an exterior of a vehicle, a doctor's office where the AED is located, a place of business where the AED is located, as well as within a proximity of the AED sufficient for a microphone of the AED to capture audio. The data processing hardware 12 of the AED 104 may execute instructions stored on the memory hardware 14 that cause the AED to perform the operations. Optionally, the server 130 may operate some or all of the operations.

At operation 602, the method 600 includes detecting a presence of multiple users 102 within the environment of the AED 104. The AED 104 executes a digital assistant 105. The AED 104 may execute multiple digital assistants simultaneously in some configurations. At operation 604, for each user 102 of the multiple users 102, the method also includes a respective active set of warm words 112A that each specify a respective action for the digital assistant 105 to perform.

At operation 606, based on the respective active set of warm words for each user of the multiple users, the method 600 includes executing a warm word arbitration routine 401 to enable a final set of warm words 112F for detection by the AED 104. Here, the final set of warm words 112F enabled for detection by the AED 104 include warm words 112 selected from the respective active set of warm words 112A for at least one user 102 of the multiple users 102 detected within the environment of the AED 104.

At operation 608, while the final set of warm words are enabled for detection by the AED 104, the method includes receiving audio data 502 corresponding to an utterance 106 captured by the AED 104, detecting a warm word 112 from the final set of warm words 112F in the audio data 502, and instructing the digital assistant to perform the respective action specified by the detected warm word.

In some examples, the final set of warm words 112F are enabled for detection by activating, for each warm word in the final set of warm words 112F, a respective warm word model 330 to run on the AED. Here, the method uses the activated respective warm word model 330 to detect the warm word in the audio data 502 without performing speech recognition on the audio data 502. More specifically, detecting the warm word in the audio data may include extracting audio features in the audio data 502, generating a warm word confidence score by using the activated respective warm word model 330 to process the extracted audio features, and determining that the audio data corresponding to the utterance includes the warm word when the warm word confidence score satisfies a warm word confidence threshold. In some examples, the warm word confidence threshold may be ascertained for a corresponding enrolled user 200 by accessing the acceptable false accept rate tolerances and/or acceptable false reject rate tolerances stored in the warm word preferences 212 for the enrolled user 200. In additional examples, when the final set of warm words 112F includes two different warm words that are phonetically similar, the warm word confidence thresholds for detecting each of these warm words may be increased to reduce the propensity for false acceptances where a warm word model 330 wrongly detects a warm word in audio instead of a phonetically similar warm word that was actually spoken.

Figure 7:
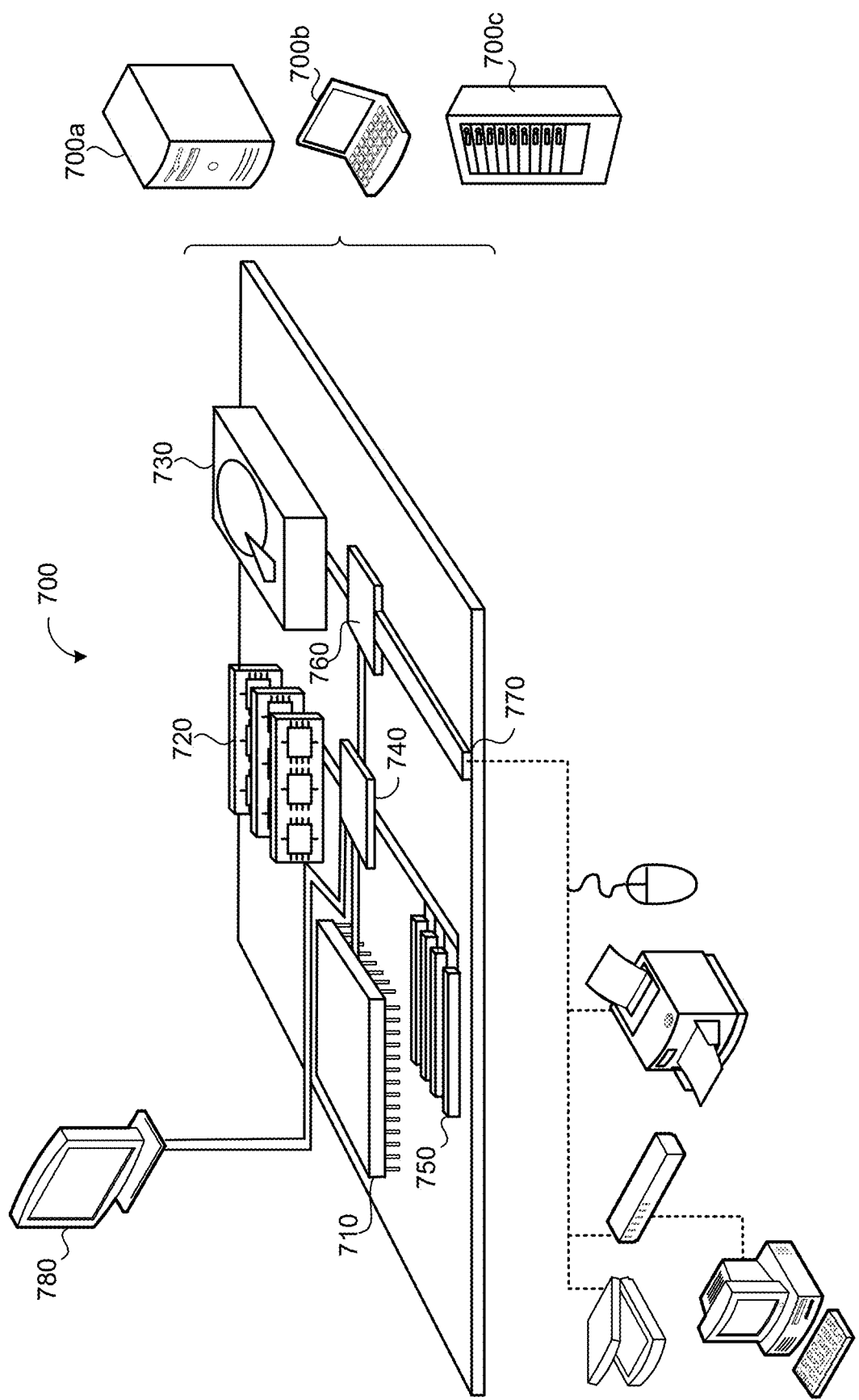
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 (e.g., the data processing hardware 10, 132 of FIG. 1) can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 (e.g., the memory hardware 12, 134 of FIG. 1) may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    detecting a presence of multiple users within an environment of an assistant-enabled device (AED), the AED executing a digital assistant;
    for each user of the multiple users, obtaining a respective active set of warm words that each specify a respective action for the digital assistant to perform;
    based on the respective active set of warm words for each user of the multiple users, executing a warm word arbitration routine to enable a final set of warm words for detection by the AED by:
    for each respective warm word in the respective active set of warm words for each user of the multiple users, determining memory and processing resources required to execute a respective warm word model on the AED that is associated with the respective warm word;
    identifying any shared warm words corresponding to warm words present in the respective active set of warm words for each of at least two of the multiple users; and
    determining a number of warm words to enable in the final set of warm words for detection by the AED based on;
    assigning, for inclusion in the final set of warm words, a higher priority to warm words identified as shared warm words; and
    the memory and processing resources determined for each of the warm words in the respective active set of warm words for each user of the multiple users, wherein the number of warm words in the final set of warm words enabled for detection by the AED comprise warm words selected from the respective active set of warm words for at least one user of the multiple users detected within the environment of the AED; and
    while the final set of warm words are enabled for detection by the AED:
    receiving audio data corresponding to an utterance captured by the AED;
    detecting, in the audio data, a warm word from the final set of warm words using the respective warm word model executing on the AED that is associated with the warm word without performing speech recognition on the audio data; and
    instructing the digital assistant to perform the respective action specified by the detected warm word.

2. The computer-implemented method of claim 1, wherein detecting the presence of the multiple users within the environment of the AED comprises detecting at least one of the multiple users is present within the environment based on proximity information of the AED relative to a user device associated with the at least one of the multiple users.

3. The computer-implemented method of claim 1, wherein detecting the presence of the multiple users within the environment of the AED comprises:
    receiving image data corresponding to a scene of the environment; and
    detecting the presence of at least one of the multiple users within the environment based on the image data.

4. The computer-implemented method of claim 1, wherein detecting the presence of the multiple users within the environment of the AED comprises detecting the presence of a corresponding user within the environment of the AED based on:
    receiving voice data characterizing a voice query issued by the corresponding user and directed toward the digital assistant;
    performing speaker identification on the voice data to identify the corresponding user that issued the voice query; and
    determining that the identified corresponding user that issued the voice query is present within the environment of the AED.

5. The computer-implemented method of claim 4, wherein:
    the voice query issued by the corresponding user comprises a command that causes the digital assistant to perform a long-standing operation specified by the command; and
    obtaining the respective active set of warm words comprises adding, in response to the digital assistant performing the long-standing operation specified by the command, to the respective active set of warm words for the corresponding user that issued the voice query, one or more warm words specifying respective actions for controlling the long-standing operation.

6. The computer-implemented method of claim 1, wherein the operations further comprise:
    detecting the presence of a new user within the environment of the AED,
    wherein the warm word arbitration routine executes in response to detecting the presence of the new user within the environment.

7. The computer-implemented method of claim 1, wherein the operations further comprise:
    determining that one of the multiple users is no longer present within the environment of the AED,
    wherein the warm word arbitration routine executes in response to determining that the one of the multiple users is no longer present within the environment.

8. The computer-implemented method of claim 1, wherein the operations further comprise:

determining addition of a new warm word to, or removal of one of the warm words from, the respective active set of warm words for one of the multiple users present in the environment of the AED, wherein the warm word arbitration routine executes in response to determining the addition of the new warm word to, or the removal of the one of the warm words from, the respective active set of warm words for the one of the multiple users present in the environment of the AED.

9. The computer-implemented method of claim 1, wherein the operations further comprise:
   determining a change in ambient context of the AED,
   wherein the warm word arbitration routine executes in response to determining the change in ambient context.

10. The computer-implemented method of claim 1, wherein executing the warm word arbitration routine further comprises:
    obtaining enabled warm word constraints, the enabled warm word constraints comprising at least one of:
    memory and computing resource availability on the AED for detection of warm words;
    an acceptable false accept rate tolerance; or
    an acceptable false reject rate tolerance; and,
    wherein determining the number of warm words to enable in the final set of warm words for detection by the AED is further based on the enabled warm word constraints.

11. The computer-implemented method of claim 1, wherein executing the warm word arbitration routine comprises:
    for each corresponding user of the multiple users, ranking the warm words in the respective active set of warm words from highest priority to lowest priority based on warm word prioritization signals, the warm word prioritization signals comprising at least one of:
    usage frequency by the corresponding user of each warm word in the respective active set of warm words;
    a current state of the AED;
    ambient context of the AED; or
    co-presence information indicating prior warm word usage and/or operations performed by the AED when the corresponding user was previously present in the environment with one or more combinations of other ones of the multiple users; and
    enabling the final set of warm words for detection by the AED based on the rankings of the warm words in the respective active set of warm words for each corresponding user of the multiple users.

12. The computer-implemented method of claim 1, wherein executing the warm word arbitration routine comprises:
    for each corresponding user of the multiple users, determining a warm word affinity score; and
    enabling the final set of warm words for detection by the AED based on the warm word affinity score determined for each corresponding user.

13. The computer-implemented method of claim 12, wherein the warm word affinity score determined for each corresponding user is based on at least one of:
    frequency of warm word usage by the corresponding user;
    frequency of interactions between the corresponding user and the digital assistant;
    duration of presence of the corresponding user in the environment of the AED;
    a proximity of the user relative to the AED; or
    a current user context.

14. The computer-implemented method of claim 1, wherein the operations further comprise:
    determining that the warm word detected in the audio data corresponding to the utterance captured by the user device comprises a speaker-specific warm word selected from the respective active set of warm words for each of one or more users among the multiple users such that the digital assistant only performs the respective action specified by the speaker-specific warm word when the speaker-specific warm word is spoken by any of the one or more users corresponding to the respective active set of warm words; and
    based on determining that the warm word detected in the audio data corresponding to the utterance captured by the user device includes a speaker-specific warm word, performing speaker verification on the audio data to determine that the utterance was spoken by one of the one or more users corresponding to the respective active set of warm words that the detected warm word was selected,
    wherein instructing the digital assistant to perform the respective action specified by the detected warm word is based on the speaker verification performed on the audio data.

15. The computer-implemented method of claim 1, wherein:
    the final set of warm words are enabled for detection by activating, for each warm word in the final set of warm words, the respective warm word model to run on the AED; and
    detecting, in the audio data, the warm word from the final set of warm words comprises detecting, using the activated respective warm word model, the warm word in the audio data without performing speech recognition on the audio data.

16. The computer-implemented method of claim 15, wherein detecting the warm word in the audio data comprises:
    extracting audio features of the audio data;
    generating, using the activated respective warm word model, a warm word confidence score by processing the extracted audio features; and
    determining that the audio data corresponding to the utterance includes the warm word when the warm word confidence score satisfies a warm word confidence threshold.

17. A system comprising:
    data processing hardware; and
    memory hardware in communication with the data processing hardware, the memory hardware storing instructions that when executed on the data processing hardware cause the data processing hardware to perform operations comprising:
    detecting a presence of multiple users within an environment of an assistant-enabled device (AED), the AED executing a digital assistant;
    for each user of the multiple users, obtaining a respective active set of warm words that each specify a respective action for the digital assistant to perform;
    based on the respective active set of warm words for each user of the multiple users, executing a warm word arbitration routine to enable a final set of warm words for detection by the AED by:
    for each respective warm word in the respective active set of warm words for each user of the multiple users, determining memory and processing resources required to execute a respective warm word model on the AED that is associated with the respective warm word;

identifying any shared warm words corresponding to warm words present in the respective active set of warm words for each of at least two of the multiple users; and determining a number of warm words to enable in the final set of warm words for detection by the AED based on:

assigning, for inclusion in the final set of warm words, a higher priority to warm words identified as shared warm words; and the memory and processing resources determined for each of the warm words in the respective active set of warm words for each user of the multiple users, wherein the number of warm words in the final set of warm words enabled for detection by the AED comprise warm words selected from the respective active set of warm words for at least one user of the multiple users detected within the environment of the AED; and while the final set of warm words are enabled for detection by the AED:

receiving audio data corresponding to an utterance captured by the AED;

detecting, in the audio data, a warm word from the final set of warm words using the respective warm word model executing on the AED that is associated with the warm word without performing speech recognition on the audio data; and instructing the digital assistant to perform the respective action specified by the detected warm word.

18. The system of claim 17, wherein detecting the presence of the multiple users within the environment of the AED comprises detecting at least one of the multiple users is present within the environment based on proximity information of the AED relative to a user device associated with the at least one of the multiple users.

19. The system of claim 17, wherein detecting the presence of the multiple users within the environment of the AED comprises:

receiving image data corresponding to a scene of the environment; and detecting the presence of at least one of the multiple users within the environment based on the image data.

20. The system of claim 17, wherein detecting the presence of the multiple users within the environment of the AED comprises detecting the presence of a corresponding user within the environment of the AED based on:

receiving voice data characterizing a voice query issued by the corresponding user and directed toward the digital assistant;

performing speaker identification on the voice data to identify the corresponding user that issued the voice query; and determining that the identified corresponding user that issued the voice query is present within the environment of the AED.

21. The system of claim 20, wherein:

the voice query issued by the corresponding user comprises a command that causes the digital assistant to perform a long-standing operation specified by the command; and obtaining the respective active set of warm words comprises adding, in response to the digital assistant performing the long-standing operation specified by the command, to the respective active set of warm words for the corresponding user that issued the voice query, one or more warm words specifying respective actions for controlling the long-standing operation.

22. The system of claim 17, wherein the operations further comprise:

detecting the presence of a new user within the environment of the AED, wherein the warm word arbitration routine executes in response to detecting the presence of the new user within the environment.

23. The system of claim 17, wherein the operations further comprise:

determining that one of the multiple users is no longer present within the environment of the AED, wherein the warm word arbitration routine executes in response to determining that the one of the multiple users is no longer present within the environment.

24. The system of claim 17, wherein the operations further comprise:

determining addition of a new warm word to, or removal of one of the warm words from, the respective active set of warm words for one of the multiple users present in the environment of the AED, wherein the warm word arbitration routine executes in response to determining the addition of the new warm word to, or the removal of the one of the warm words from, the respective active set of warm words for the one of the multiple users present in the environment of the AED.

25. The system of claim 17, wherein the operations further comprise:

determining a change in ambient context of the AED, wherein the warm word arbitration routine executes in response to determining the change in ambient context.

26. The system of claim 17, wherein executing the warm word arbitration routine further comprises:

obtaining enabled warm word constraints, the enabled warm word constraints comprising at least one of:

memory and computing resource availability on the AED for detection of warm words;

an acceptable false accept rate tolerance; or an acceptable false reject rate tolerance; and, wherein determining the number of warm words to enable in the final set of warm words for detection by the AED is further based on the enabled warm word constraints.

27. The system of claim 17, wherein executing the warm word arbitration routine comprises:

for each corresponding user of the multiple users, ranking the warm words in the respective active set of warm words from highest priority to lowest priority based on warm word prioritization signals, the warm word prioritization signals comprising at least one of:

usage frequency by the corresponding user of each warm word in the respective active set of warm words;

a current state of the AED;

ambient context of the AED; or co-presence information indicating prior warm word usage and/or operations performed by the AED when the corresponding user was previously present in the environment with one or more combinations of other ones of the multiple users; and enabling the final set of warm words for detection by the AED based on the rankings of the warm words in the respective active set of warm words for each corresponding user of the multiple users.

28. The system of claim 17, wherein executing the warm word arbitration routine comprises:

for each corresponding user of the multiple users, determining a warm word affinity score; and enabling the final set of warm words for detection by the AED based on the warm word affinity score determined for each corresponding user.

29. The system of claim 28, wherein the warm word affinity score determined for each corresponding user is based on at least one of:
- frequency of warm word usage by the corresponding user;
- frequency of interactions between the corresponding user and the digital assistant;
- duration of presence of the corresponding user in the environment of the AED;
- a proximity of the user relative to the AED; or
- a current user context.

30. The system of claim 17, wherein the operations further comprise:
- determining that the warm word detected in the audio data corresponding to the utterance captured by the user device comprises a speaker-specific warm word selected from the respective active set of warm words for each of one or more users among the multiple users such that the digital assistant only performs the respective action specified by the speaker-specific warm word when the speaker-specific warm word is spoken by any of the one or more users corresponding to the respective active set of warm words; and
- based on determining that the warm word detected in the audio data corresponding to the utterance captured by the user device includes a speaker-specific warm word, performing speaker verification on the audio data to determine that the utterance was spoken by one of the one or more users corresponding to the respective active set of warm words that the detected warm word was selected, wherein instructing the digital assistant to perform the respective action specified by the detected warm word is based on the speaker verification performed on the audio data.

31. The system of claim 17, wherein:
- the final set of warm words are enabled for detection by activating, for each warm word in the final set of warm words, the respective warm word model to run on the AED; and
- detecting, in the audio data, the warm word from the final set of warm words comprises detecting, using the activated respective warm word model, the warm word in the audio data without performing speech recognition on the audio data.

32. The system of claim 31, wherein detecting the warm word in the audio data comprises:
- extracting audio features of the audio data;
- generating, using the activated respective warm word model, a warm word confidence score by processing the extracted audio features; and
- determining that the audio data corresponding to the utterance includes the warm word when the warm word confidence score satisfies a warm word confidence threshold.

* * * * *